United States Patent
Rogers et al.

(10) Patent No.: US 10,785,266 B2
(45) Date of Patent: Sep. 22, 2020

(54) METHODS AND SYSTEMS FOR PROTECTING A SECURED NETWORK

(71) Applicant: Centripetal Networks, Inc., Portsmouth, NH (US)

(72) Inventors: Steven Rogers, Leesburg, VA (US); Sean Moore, Hollis, NH (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

(21) Appl. No.: 16/728,766

(22) Filed: Dec. 27, 2019

(65) Prior Publication Data
US 2020/0137121 A1    Apr. 30, 2020

Related U.S. Application Data

(63) Continuation of application No. 16/111,524, filed on Aug. 24, 2018, now Pat. No. 10,567,437, which is a (Continued)

(51) Int. Cl.
*H04L 29/06* (2006.01)
*H04L 29/08* (2006.01)

(52) U.S. Cl.
CPC .......... *H04L 63/20* (2013.01); *H04L 63/0209* (2013.01); *H04L 63/0218* (2013.01); (Continued)

(58) Field of Classification Search
CPC . H04L 63/20; H04L 63/0209; H04L 63/0218; H04L 63/0236; H04L 67/02
See application file for complete search history.

(56) References Cited

U.S. PATENT DOCUMENTS 6,098,172 A  8/2000 Coss et al.
6,147,976 A  11/2000 Shand et al.
(Continued)

FOREIGN PATENT DOCUMENTS

AU  2005328336 B2  9/2011
AU  2006230171 B2  6/2012
(Continued)

OTHER PUBLICATIONS

Xu et al., Source Address Filtering Firewall to Defend against Denial of Service Attacks, Sep. 2004, IEEE 60th Vehicular Technology Conference, vol. 5, pp. 3296-3300 (Year: 2004).*
(Continued)

*Primary Examiner* — Kenneth W Chang
(74) *Attorney, Agent, or Firm* — Banner & Witcoff, Ltd.

(57) ABSTRACT

Methods and systems for protecting a secured network are presented. For example, one or more packet security gateways may be associated with a security policy management server. At each packet security gateway, a dynamic security policy may be received from the security policy management server, packets associated with a network protected by the packet security gateway may be received, and at least one of multiple packet transformation functions specified by the dynamic security policy may be performed on the packets. Performing the at least one of multiple packet transformation functions specified by the dynamic security policy on the packets may include performing at least one packet transformation function other than forwarding or dropping the packets.

27 Claims, 10 Drawing Sheets

Related U.S. Application Data continuation of application No. 15/413,834, filed on Jan. 24, 2017, now Pat. No. 10,091,246, which is a continuation of application No. 14/698,560, filed on Apr. 28, 2015, now Pat. No. 9,560,077, which is a continuation of application No. 13/657,010, filed on Oct. 22, 2012, now Pat. No. 9,137,205.

(52) U.S. Cl.
CPC ...... *H04L 63/0236* (2013.01); *H04L 63/0263* (2013.01); *H04L 67/02* (2013.01)

(56) References Cited

U.S. PATENT DOCUMENTS

| | | | |
|---|---|---|---|
| 6,226,372 B1 | 5/2001 | Beebe et al. | |
| 6,279,113 B1 | 8/2001 | Vaidya | |
| 6,317,837 B1 | 11/2001 | Kenworthy | |
| 6,400,707 B1 * | 6/2002 | Baum | H04L 63/0263 370/352 |
| 6,484,261 B1 | 11/2002 | Wiegel | |
| 6,611,875 B1 | 8/2003 | Chopra et al. | |
| 6,662,235 B1 | 12/2003 | Callis et al. | |
| 6,678,827 B1 | 1/2004 | Rothermel et al. | |
| 6,826,694 B1 | 11/2004 | Dutta et al. | |
| 6,907,042 B1 | 6/2005 | Oguchi | |
| 6,971,028 B1 | 11/2005 | Lyle et al. | |
| 7,089,581 B1 | 8/2006 | Nagai et al. | |
| 7,095,716 B1 | 8/2006 | Ke et al. | |
| 7,107,613 B1 | 9/2006 | Chen et al. | |
| 7,143,438 B1 | 11/2006 | Coss et al. | |
| 7,152,240 B1 | 12/2006 | Green et al. | |
| 7,185,368 B2 | 2/2007 | Copeland, III | |
| 7,215,637 B1 | 5/2007 | Ferguson et al. | |
| 7,225,269 B2 | 5/2007 | Watanabe | |
| 7,227,842 B1 | 6/2007 | Ji et al. | |
| 7,237,267 B2 | 6/2007 | Rayes et al. | |
| 7,263,099 B1 | 8/2007 | Woo et al. | |
| 7,296,288 B1 | 11/2007 | Hill et al. | |
| 7,299,353 B2 | 11/2007 | Le Pennec et al. | |
| 7,331,061 B1 | 2/2008 | Ramsey et al. | |
| 7,478,429 B2 | 1/2009 | Lyon | |
| 7,499,412 B2 | 3/2009 | Matityahu et al. | |
| 7,539,186 B2 | 5/2009 | Aerrabotu et al. | |
| 7,610,621 B2 | 10/2009 | Turley et al. | |
| 7,684,400 B2 | 3/2010 | Govindarajan et al. | |
| 7,710,885 B2 | 5/2010 | Ilnicki et al. | |
| 7,721,084 B2 | 5/2010 | Salminen et al. | |
| 7,792,775 B2 | 9/2010 | Matsuda | |
| 7,814,158 B2 | 10/2010 | Malik | |
| 7,814,546 B1 | 10/2010 | Strayer et al. | |
| 7,818,794 B2 | 10/2010 | Wittman | |
| 7,849,502 B1 | 12/2010 | Bloch et al. | |
| 7,913,303 B1 | 3/2011 | Rouland et al. | |
| 7,954,143 B2 | 5/2011 | Aaron | |
| 8,004,994 B1 | 8/2011 | Darisi et al. | |
| 8,009,566 B2 | 8/2011 | Zuk et al. | |
| 8,037,517 B2 | 10/2011 | Fulp et al. | |
| 8,042,167 B2 | 10/2011 | Fulp et al. | |
| 8,117,655 B2 | 2/2012 | Spielman | |
| 8,156,206 B2 | 4/2012 | Kiley et al. | |
| 8,176,561 B1 | 5/2012 | Hurst et al. | |
| 8,219,675 B2 | 7/2012 | Ivershen | |
| 8,271,645 B2 | 9/2012 | Rajan et al. | |
| 8,306,994 B2 | 11/2012 | Kenworthy | |
| 8,307,029 B2 | 11/2012 | Davis et al. | |
| 8,331,234 B1 | 12/2012 | Newton et al. | |
| 8,422,391 B2 | 4/2013 | Zhu | |
| 8,495,725 B2 | 7/2013 | Ahn | |
| 8,510,821 B1 | 8/2013 | Brandwine et al. | |
| 8,726,379 B1 | 5/2014 | Stiansen et al. | |
| 8,738,906 B1 * | 5/2014 | Sampath | H04N 21/643 713/166 |
| 8,789,135 B1 | 7/2014 | Pani | |
| 8,806,638 B1 | 8/2014 | Mani | |
| 8,832,832 B1 | 9/2014 | Visbal | |
| 8,839,417 B1 * | 9/2014 | Jordan | H04L 63/0227 726/22 |
| 8,856,926 B2 | 10/2014 | Narayanaswamy et al. | |
| 8,935,785 B2 | 1/2015 | Pandrangi | |
| 9,094,445 B2 | 7/2015 | Moore et al. | |
| 9,124,552 B2 | 9/2015 | Moore | |
| 9,137,205 B2 | 9/2015 | Rogers et al. | |
| 9,154,446 B2 | 10/2015 | Gemelli et al. | |
| 9,160,713 B2 | 10/2015 | Moore | |
| 9,172,627 B2 | 10/2015 | Kjendal et al. | |
| 9,419,942 B1 | 8/2016 | Buruganahalli et al. | |
| 9,531,672 B1 | 12/2016 | Li et al. | |
| 9,634,911 B2 | 4/2017 | Meloche | |
| 9,686,193 B2 | 6/2017 | Moore | |
| 2001/0039579 A1 | 11/2001 | Trcka et al. | |
| 2001/0039624 A1 | 11/2001 | Kellum | |
| 2002/0016858 A1 | 2/2002 | Sawada et al. | |
| 2002/0038339 A1 | 3/2002 | Xu | |
| 2002/0049899 A1 | 4/2002 | Kenworthy | |
| 2002/0083345 A1 | 6/2002 | Halliday et al. | |
| 2002/0112188 A1 | 8/2002 | Syvanne | |
| 2002/0152209 A1 | 10/2002 | Merugu et al. | |
| 2002/0164962 A1 | 11/2002 | Mankins et al. | |
| 2002/0165949 A1 | 11/2002 | Na et al. | |
| 2002/0186683 A1 | 12/2002 | Buck et al. | |
| 2002/0198981 A1 | 12/2002 | Corl et al. | |
| 2003/0005122 A1 | 1/2003 | Freimuth et al. | |
| 2003/0014665 A1 | 1/2003 | Anderson et al. | |
| 2003/0018591 A1 | 1/2003 | Komisky | |
| 2003/0035370 A1 | 2/2003 | Brustoloni | |
| 2003/0051026 A1 | 3/2003 | Carter et al. | |
| 2003/0088787 A1 | 5/2003 | Egevang | |
| 2003/0097590 A1 | 5/2003 | Syvanne | |
| 2003/0105976 A1 | 6/2003 | Copeland | |
| 2003/0118038 A1 * | 6/2003 | Jalava | H04L 63/0263 370/401 |
| 2003/0120622 A1 | 6/2003 | Nurmela et al. | |
| 2003/0123456 A1 | 7/2003 | Denz et al. | |
| 2003/0142681 A1 | 7/2003 | Chen et al. | |
| 2003/0145225 A1 | 7/2003 | Bruton et al. | |
| 2003/0154297 A1 | 8/2003 | Suzuki et al. | |
| 2003/0154399 A1 | 8/2003 | Zuk et al. | |
| 2003/0188192 A1 | 10/2003 | Tang et al. | |
| 2003/0212900 A1 | 11/2003 | Liu et al. | |
| 2003/0220940 A1 | 11/2003 | Futoransky et al. | |
| 2004/0010712 A1 | 1/2004 | Hui et al. | |
| 2004/0015719 A1 | 1/2004 | Lee et al. | |
| 2004/0073655 A1 | 4/2004 | Kan et al. | |
| 2004/0088542 A1 | 5/2004 | Daude et al. | |
| 2004/0093513 A1 | 5/2004 | Cantrell et al. | |
| 2004/0098511 A1 | 5/2004 | Lin et al. | |
| 2004/0114518 A1 | 6/2004 | MacFaden et al. | |
| 2004/0123220 A1 | 6/2004 | Johnson et al. | |
| 2004/0131056 A1 | 7/2004 | Dark | |
| 2004/0148520 A1 | 7/2004 | Talpade et al. | |
| 2004/0151155 A1 | 8/2004 | Jouppi | |
| 2004/0172529 A1 | 9/2004 | Culbert | |
| 2004/0172557 A1 | 9/2004 | Nakae et al. | |
| 2004/0177139 A1 | 9/2004 | Schuba et al. | |
| 2004/0181690 A1 | 9/2004 | Rothermel et al. | |
| 2004/0193943 A1 | 9/2004 | Angelino et al. | |
| 2004/0199629 A1 | 10/2004 | Bomer et al. | |
| 2004/0205360 A1 | 10/2004 | Norton et al. | |
| 2004/0250124 A1 | 12/2004 | Chesla et al. | |
| 2005/0010765 A1 | 1/2005 | Swander et al. | |
| 2005/0024189 A1 | 2/2005 | Weber | |
| 2005/0071650 A1 | 3/2005 | Jo et al. | |
| 2005/0076227 A1 | 4/2005 | Kang et al. | |
| 2005/0108557 A1 | 5/2005 | Kayo et al. | |
| 2005/0114704 A1 | 5/2005 | Swander | |
| 2005/0117576 A1 | 6/2005 | McDysan et al. | |
| 2005/0125697 A1 | 6/2005 | Tahara | |
| 2005/0138204 A1 | 6/2005 | Iyer et al. | |
| 2005/0138353 A1 | 6/2005 | Spies et al. | |
| 2005/0141537 A1 | 6/2005 | Kumar et al. | |
| 2005/0183140 A1 | 8/2005 | Goddard | |
| 2005/0229246 A1 | 10/2005 | Rajagopal et al. | |
| 2005/0249214 A1 | 11/2005 | Peng | |

(56) References Cited

U.S. PATENT DOCUMENTS

| | | |
|---|---|---|
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0123481 A1* | 6/2006 | Bhatnagar ........... H04L 63/0236 726/24 |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0150996 A1* | 6/2009 | Haswell ................ G06F 21/554 726/22 |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0311693 A1 | 12/2012 | Horman et al. |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0081102 A1 | 3/2013 | Beauvais et al. |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0254766 A1 | 9/2013 | Zuo et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245421 A1* | 8/2014 | Lyon ................ H04L 61/2539 726/11 |
| 2014/0245423 A1 | 8/2014 | Lee |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0317737 A1 | 10/2014 | Shin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0033336 A1 | 1/2015 | Wang et al. |
| 2015/0052601 A1 | 2/2015 | White et al. |
| 2015/0106930 A1 | 4/2015 | Honda et al. |
| 2015/0128274 A1 | 5/2015 | Giokas |
| 2015/0135325 A1* | 5/2015 | Stevens ............... H04L 63/1425 726/25 |
| 2015/0207809 A1 | 7/2015 | MacAulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0347246 A1 | 12/2015 | Matsui et al. |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0112443 A1 | 4/2016 | Grossman et al. |
| 2016/0119365 A1 | 4/2016 | Barel |
| 2016/0127417 A1 | 5/2016 | Janssen |
| 2016/0191558 A1 | 6/2016 | Davison |
| 2016/0205069 A1 | 7/2016 | Blocher et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |

(56) References Cited

U.S. PATENT DOCUMENTS

| | | | |
|---|---|---|---|
| 2016/0366099 A1 | 12/2016 | Jordan | |
| 2017/0223046 A1 | 8/2017 | Singh | |
| 2017/0272469 A1 | 9/2017 | Kraemer et al. | |

FOREIGN PATENT DOCUMENTS

| | | | |
|---|---|---|---|
| CA | 2600236 A1 | 10/2006 | |
| EP | 1006701 A2 | 6/2000 | |
| EP | 1313290 A1 | 5/2003 | |
| EP | 1484884 A2 | 12/2004 | |
| EP | 1677484 A2 | 7/2006 | |
| EP | 2385676 A1 | 11/2011 | |
| EP | 2498442 A1 | 9/2012 | |
| EP | 1864226 B1 | 5/2013 | |
| KR | 20010079361 A | 8/2001 | |
| WO | 2005046145 A1 | 5/2005 | |
| WO | 2006093557 A2 | 9/2006 | |
| WO | 2006105093 A2 | 10/2006 | |
| WO | 2007109541 A2 | 9/2007 | |
| WO | 2011038420 A2 | 3/2011 | |
| WO | 2012146265 A1 | 11/2012 | |

OTHER PUBLICATIONS

Feb. 11, 2020 U.S. Final Written Decision Determining All Challenged Claims Unpatentable of U.S. Pat. No. 9,137,205 B2—IPR 2018-01444.
Feb. 11, 2020 U.S. Final Written Decision Determining All Challenged Claims Unpatentable of U.S. Pat. No. 9,137,205 B2—IPR 2018-01443.
Mar. 19, 2020 U.S. Final Written Decision Determining All Challenged Claims Unpatentable of U.S. Pat. No. 9,565,213 B2—IPR 2018-01512.
Jan. 23, 2020 U.S. Final Written Decision Determining All Challenged Claims Unpatentable of U.S. Pat. No. 9,565,213 B2—IPR 2018-01386.
Mar. 21, 2020 U.S. Final Written Decision Determining All Challenged Claims Unpatentable of U.S. Pat. No. 9,560,077 B2—IPR 2018-01513.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015 (WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 U.S. Notice of Allowance—U.S. Appl. No. 14/702,755.
Apr. 15, 2016 U.S. Notice of Allowance—U.S. Appl. No. 14/855,374.
Apr. 26, 2016 U.S. Office Action—U.S. Appl. No. 14/745,207.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Solent Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.

(56) References Cited

OTHER PUBLICATIONS

G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35, 1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, Apr. 13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing A Zero Trust Network With Next-Generation Firewalls"; pp. 1-10; last viewed on Oct. 21, 2012.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "*LSMAC* vs. *LSNAT*: Scalable Cluster-based Web servers", Journal of Networks, Software Tools, and Applications, 3(3): 175-185, 2000.
Jul. 5, 2018 U.S. Non-Final Office Action—U.S. Appl. No. 15/413,750.
Jul. 13, 2018 U.S. Notice of Allowance—U.S. Appl. No. 15/414,117.
Jul. 27, 2018 U.S. Non-Final Office Action—U.S. Appl. No. 15/382,806.
Sourcefire 3D System User Guide, Version 4.10, Mar. 16, 2011, 2123 pages.
Jul. 11, 2018 U.S. Declaration of Kevin Jeftay, PhD in Support of Petition for Inter Partes Review of U.S. Pat. No. 9,565,213—IPR2018-01386.
Ylonen, et al, "The Secure Shell (SSH) Transport Layer Protocol," SSH Communication Security Corp, Newtork Norking Group RFC 4253, Jan. 2006, 32 pages.
Jul. 20, 2018 U.S. Declaration of Dr. Stuart Staniford in Support of Petition for Inter Partes Review of U.S. Pat. No. 9,160,713—IPR2018-01437.
Jul. 20, 2018 U.S. Declaration of Dr. Stuart Staniford in Support of Petition for Inter Partes Review of U.S. Pat. No. 9,124,552—IPR2018-01436.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017 U.S. Notice of Allowance—U.S. Appl. No. 14/625,486.
Feb. 15, 2017—U.S. Notice of Allowance—U.S. Appl. No. 14/921,718.
Jul. 20, 2017 U.S. Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 U.S. Defendant Ixia's Partial Answer to Complaint for Patent Infringement—Case No. 2:17-cv-00383-HCN-LRL, Document 29, 14 pages.

(56) References Cited

OTHER PUBLICATIONS

Sep. 5, 2017 U.S. Memorandum in Support of Defendant's Ixia and Keysight Technologies, Inc's Motion to Dismiss for Unpatentability Under 35 U S C § 101—Case No. 2:17-cv-00383-HCM-LRL, Document 21, 29 pages.
Sep. 5, 2017 U.S. Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "OPTWALL: A Hierarchical Traffic-Aware Firewall," Department of Computer Science, Telecommunications Program, University of Pittsburgh, pp. 1-11 (2007).
Bellion, "High Performance Packet Classification", http://www.hipac.org (Publication Date Unknown).
C. Benecke, "A Parallel Packet Screen for High Speed Networks", Proceedings of the 15th Annual Computer Security Applications Conference, 1999.
Chen, et al, "Research on the Anomaly Discovering Algorithm of the Packet Filtering Rule Sets," Sep. 2010, First International Confererence on Pervasive Computing, Signal Processing and Applications, pp. 362-366.
D. Corner, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
Jul. 26, 2018 U.S. Declaration of Kevin Jeffay, PhD in Support of Second Petition for Inter Partes Review of U.S. Pat. No. 9,137,205—IPR2018-01444.
Nichols, et al, "Definition of the Differentiated Services Field (DS Field) in the IPv4 and IPv6 Headers," Network Working Group RFC 2474, Dec. 1998, 20 pages.
Jul. 26, 2018 U.S. Declaration of Kevin Jeffay, PhD in Support of First Petition for Inter Partes Review of U.S. Pat. No. 9,137,205—IPR2018-01443.
Perkins, "IP Encapsulation with IP," Network Working Group RFC 2003, Oct. 1996, 14 pages.
Jul. 12, 2018 U.S. Petition for Inter Partes Review of U.S. Pat. No. 9,565,213—IPR2018-01386.
Jul. 20, 2018 U.S. Petition for Inter Partes Review of U.S. Pat. No. 9,160,713—IPR2018-01437.
Jul. 20, 2018 U.S. Petition for Inter Partes Review of U.S. Pat. No. 9,124,552—IPR2018-01436.
Blake, et al, "An Architecture for Differentiated Services," Network Working Group RFC 2475, Dec. 1998, 36 pages.
Jul. 27, 2018 U.S. Second Petition for Inter Partes Review of U.S. Pat. No. 9,137,205—IPR2018-01444.
Jul. 27, 2018 U.S. First Petition for Inter Partes Review of U.S. Pat. No. 9,137,205—IPR2018-01443.
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Aug. 20, 2008 U.S. Petition for Inter Partes Review of U.S. Pat. No. 9,565,213—IPR2018-01512.
Aug. 15, 2018 U.S. Declaration of Kevin Jeffay, PhD in Support of Petition for Inter Partes Review of U.S. Pat. No. 9,565,213—IPR2018-01512.
"Cisco ACNS Softward Configuration Guide for Centrally Managed Deployments," Release 5.5. Text Part No. OL-9136-01, Cisco Systems, Inc., 2006, 944 pages.
Blake, et al., "An Architecture for Differentiated Services," also known as the Diffsery architecture, as defined in RFC 2475, Network Working Group, Dec. 1998, 36 pages.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Aug. 29, 2018 (CA) Office Action—App. 2,888,935.
Feb. 6, 2019 U.S. Final Office Action—U.S. Appl. No. 15/413,750.
Frahim, et al., "Cisco ASA: All-in-One Firewall, IPS, and VPN Adaptive Security Appliance," Indiana: Cisco Press: 2006, 54 pages.
Aug. 10, 2018 U.S. Declaration of Kevin Jeffay, PhD in Support of Fourth Petition for Inter Partes Review of U.S. Pat. No. 9,137,205—IPR2018-01506.
Aug. 10, 2018 U.S. Fourth Petition for Inter Partes Review of U.S. Pat. No. 9,137,205—IPR2018-01506.
Aug. 3, 2018 U.S. Third Petition for Inter Partes Review of U.S. Pat. No. 9,137,205—IPR2018-01505.
Aug. 3, 2018 U.S. Declaration of Kevin Jeffay, PhD in Support of Third Petition for Inter Partes Review of U.S. Pat. No. 9,137,205—IPR2018-01505.
Aug. 3, 2018 U.S. Declaration of Kevin Jeffay, PhD in Support of Third Petition for Inter Partes Review of U.S. Pat. No. 9,560,077—IPR2018-01513.
Apr. 2, 2019 U.S. Decision—Institution of Inter Partes Review of U.S. Pat. No. 9,560,077—IPR 2018-01513.
Aug. 10, 2018 U.S. Petition for Inter Partes Review of Claims 1-20 of U.S. Pat. No. 9,560,077—IPR2018-01513.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9.
Jul. 2, 2020—(U.S.) Final Rejection—U.S. Appl. No. 16/158,868.

* cited by examiner

| Rule # | Protocol | Source Address | Source Port | Destination Address | Destination Port | Action |
|---|---|---|---|---|---|---|
| 1 (302) | TCP | 140.* | * | 130.* | 20 | Accept |
| 2 (304) | TCP | 140.* | * | * | 80 | Accept |
| 3 (306) | TCP | 150.* | * | 120.* | 90 | Accept & Route to Monitoring Device |
| 4 (308) | UDP | 150.* | * | * | 3030 | Accept |
| 5 (310) | * | * | * | * | * | Deny | five-tuple: {Protocol, Source Address, Source Port, Destination Address, Destination Port}

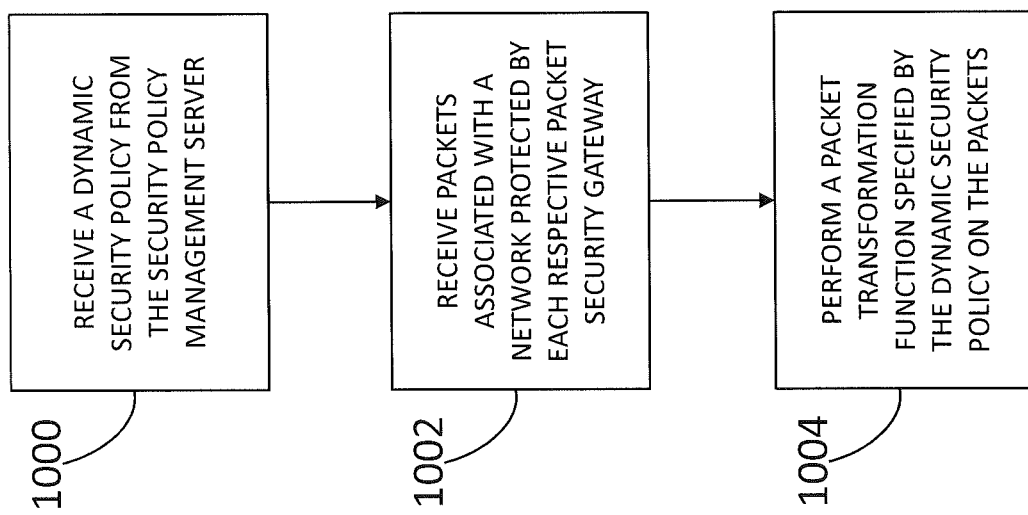

METHODS AND SYSTEMS FOR PROTECTING A SECURED NETWORK

CROSS-REFERENCE TO RELATED APPLICATION

This application is a continuation of co-pending U.S. patent application Ser. No. 16/111,524, filed Nov. 25, 2019, entitled "METHOD AND SYSTEMS FOR PROTECTING A SECURED NETWORK", which is a continuation of U.S. patent application Ser. No. 15/413,834, filed Jan. 24, 2017 (now U.S. Pat. No. 10,091,246), entitled "METHODS AND SYSTEMS FOR PROTECTING A SECURED NETWORK," which is a continuation of U.S. patent application Ser. No. 14/698,560 (now U.S. Pat. No. 9,560,077), filed Apr. 28, 2015, entitled "METHODS AND SYSTEMS FOR PROTECTING A SECURED NETWORK," which is a continuation of U.S. patent application Ser. No. 13/657,010 (now U.S. Pat. No. 9,137,205), filed Oct. 22, 2012, entitled "METHODS AND SYSTEMS FOR PROTECTING A SECURED NETWORK." The disclosures of each of these applications are incorporated by reference herein in their entirety and made part hereof.

BACKGROUND

The TCP/IP network protocols (e.g., the Transmission Control Protocol (TCP) and the Internet Protocol (IP)) were designed to build large, resilient, reliable, and robust networks. Such protocols, however, were not originally designed with security in mind. Subsequent developments have extended such protocols to provide for secure communication between peers (e.g., Internet Protocol Security (IPsec)), but the networks themselves remain vulnerable to attack (e.g., Distributed Denial of Service (DDoS) attacks).

Most existing approaches to protecting such networks are reactive rather than proactive. While reactive approaches may identify the source of an attack and assist in subsequent mitigation efforts, in most instances, the attack will have already been successfully launched.

Proactive solutions, however, have often been deemed untenable due to an inability to scale to larger networks. A significant challenge associated with building a scalable proactive solution is the need to filter substantially all network traffic at a high resolution. In a large network, where traffic volumes may be enormous, the time required to provide high resolution filtering has traditionally been thought to render a proactive solution infeasible.

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the description below.

Aspects of this disclosure relate to protecting a secured network. In some embodiments, one or more packet security gateways are associated with a security policy management server. At each of the packet security gateways, a dynamic security policy may be received from the security policy management server, packets associated with a network protected by the packet security gateway may be received, and at least one of multiple packet transformation functions specified by the dynamic security policy may be performed on the packets. Performing the at least one of multiple packet transformation functions specified by the dynamic security policy on the packets may include performing at least one packet transformation function other than forwarding or dropping the packets.

In some embodiments, two or more of the packet security gateways may be configured in series such that packets forwarded from a first of the packet security gateways are received by a second of the packet security gateways. In some embodiments, the dynamic security policy may include two rules requiring sequential execution. A first of the packet security gateways may perform a packet transformation function specified by one of the rules on the packets and a second of the packet security gateways may subsequently perform a packet transformation function specified by the other of the rules on packets received from the first packet security gateway.

In some embodiments, the dynamic security policy may include a rule specifying a set of network addresses for which associated packets should be dropped and a rule specifying that all packets associated with network addresses outside the set should be forwarded. Additionally or alternatively, the dynamic security policy may include a rule specifying a set of network addresses for which associated packets should be forwarded and a rule specifying that all packets associated with network addresses outside the set should be dropped. In some embodiments, the security policy management server may receive information associated with one or more Voice over Internet Protocol (VoIP) sessions and the set of network addresses for which associated packets should be forwarded may be created or altered utilizing the information associated with the one or more VoIP sessions.

In some embodiments, the packet security gateways may receive three or more dynamic security policies from the security policy management server. A first of the dynamic security policies may specify a first set of network addresses for which packets should be forwarded. A second of the dynamic security policies may be received after the first and may specify a second set of network addresses, which includes more network addresses than the first set, for which packets should be forwarded. A third of the dynamic security policies may be received after the second and may specify a third set of network addresses, which includes more network addresses than the second set, for which packets should be forwarded.

In some embodiments, the dynamic security policy may include two rules that each specify a set of network addresses. The dynamic security policy may specify that packets associated with the first set of network addresses should be placed in a first forwarding queue and packets associated with the second set of network addresses should be placed in a second forwarding queue. The first forwarding queue may have a different queueing policy, for example, a higher forwarding rate, than the second forwarding queue.

In some embodiments, the dynamic security policy may include a rule specifying a set of network addresses and an additional parameter. The packet transformation function specified by the dynamic security policy may include routing packets that fall within the specified set and match the additional parameter to a network address different from a destination network address specified by the packets. In some embodiments, the additional parameter may be a Session Initiation Protocol (SIP) Uniform Resource Identifier (URI). The network address different from the destination network address may correspond to a device configured to copy information contained within the packets and forward the packets to the destination network address specified by the packets.

In some embodiments, the packet transformation function may forward the packets into the network protected by the packet security gateway. In some embodiments, the packet transformation function may forward the packets out of the network protected by the packet security gateway. In some embodiments, the packet transformation function may forward the one or more packets to an IPsec stack having an IPsec security association corresponding to the packets. In some embodiments, the packet transformation function may drop the packets.

In some embodiments, the dynamic security policy may include multiple rules. One of the rules may specify the packet transformation function. In some embodiments, one of the rules may specify a five-tuple of values selected from packet header information. The five-tuple may specify one or more protocol types, one or more IP source addresses, one or more source ports, one or more IP destination addresses, and one or more destination ports. In some embodiments, one of the rules may specify a Differentiated Service Code Point (DSCP) that maps to a DSCP field in an IP header of one of the packets.

In some embodiments, one of the packet security gateways may operate in a network layer transparent manner. For example, the packet security gateway may send and receive traffic at a link layer using an interface that is not addressed at the network layer and simultaneously perform the packet transformation function at the network layer. Additionally or alternatively, the packet security gateway may include a management interface having a network layer address. Access to the management interface may be secured at the application level.

In some embodiments, the dynamic security policy may include a rule generated based, at least in part, on a list of known network addresses associated with malicious network traffic. In some embodiments, the list of known network addresses associated with malicious network traffic may be received from a subscription service that aggregates information associated with malicious network traffic.

In some embodiments, the packets associated with the network protected by the packet security gateway may originate within the network protected by the packet security gateway and may be destined for a network distinct from the network protected by the packet security gateway. Additionally or alternatively, the packets associated with the network protected by the packet security gateway may originate within a network distinct from the network protected by the packet security gateway and may be destined for a host within the network protected by the packet security gateway.

In some embodiments, one of the packet security gateways may be located at each boundary between a protected network associated with the security policy management server and an unprotected network.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

FIG. 3 illustrates an exemplary dynamic security policy.

FIG. 10 illustrates an exemplary method for protecting a secured network.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless. In this respect, the specification is not intended to be limiting.

Figure 1:
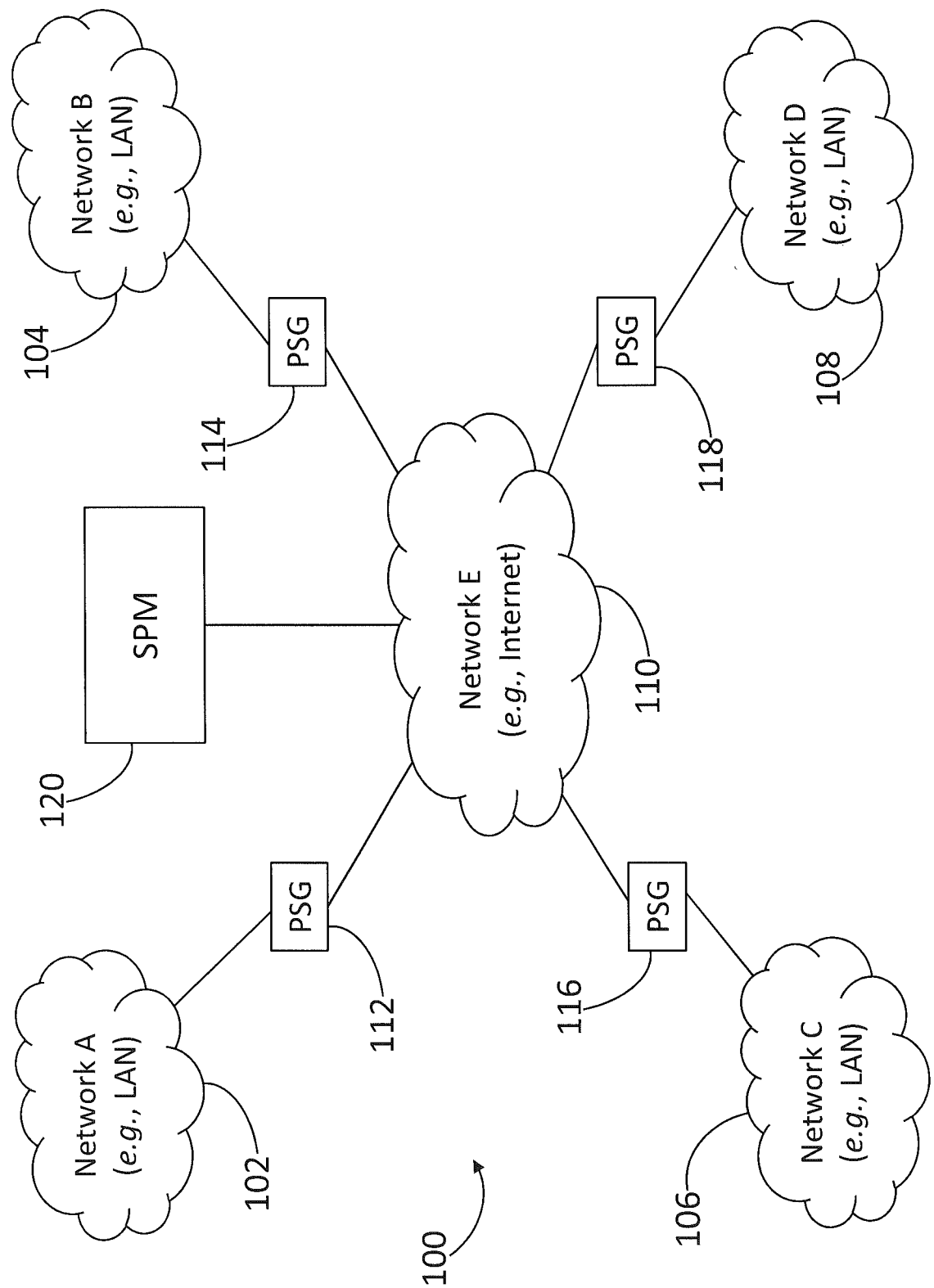
FIG. 1 illustrates an exemplary network environment in which one or more aspects of the disclosure may be implemented.

FIG. 1 illustrates an exemplary network environment in which one or more aspects of the disclosure may be implemented. Referring to FIG. 1, network environment 100 may include networks A-E 102, 104, 106, 108, and 110. One or more networks within network environment 100 may be a Local Area Network (LAN) or a Wide Area Network (WAN). Such a LAN or WAN may be associated, for example, with an organization (e.g., a company, university, enterprise, or government agency). For example, networks A-D 102, 104, 106, and 108 may be LANs, any combination of which may be associated with one or more organizations. One or more networks within network environment 100 may interface with one or more other networks within network environment 100. For example, network environment 100 may include a WAN that interfaces one or more LANs within network environment 100 or network environment 100 may include one or more Internet Service Providers (ISPs) that interface one or more LANs or WANs within network environment 100 via the Internet. For example, network E 110 may comprise the Internet and may interface networks A-D 102, 104, 106, and 108.

As used herein, a packet security gateway includes any computing device configured to receive packets and perform a packet transformation function on the packets. Optionally, a packet security gateway may further be configured to perform one or more additional functions as described herein. As used herein, a security policy management server includes any computing device configured to communicate a dynamic security policy to a packet security gateway. Optionally, a security policy management server may further be configured to perform one or more additional functions as described herein. As used herein, a dynamic security policy includes any rule, message, instruction, file, data structure, or the like that specifies criteria corresponding to one or more packets and identifies a packet transformation function to be performed on packets corresponding to the specified criteria. Optionally, a dynamic security policy may further specify one or more additional parameters as described herein.

Network environment 100 may include one or more packet security gateways and one or more security policy management servers. For example, network environment 100 may include packet security gateways 112, 114, 116, and 118, and security policy management server 120. One or more security policy management servers may be associated with a protected network. For example, networks A-D 102, 104, 106, and 108 may each be distinct LANs associated with a common organization and may each form part of a protected network associated with security policy management server 120. Many network protocols route packets dynamically, and thus the path a given packet may take cannot be readily predicted. Accordingly it may be advantageous to locate a packet security gateway at each boundary between a protected network and an unprotected network. For example, packet security gateway 112 may be located at the boundary between network A 102 and network E 110. Similarly, packet security gateway 114 may be located at the boundary between network B 104 and network E 110; packet security gateway 116 may be located at the boundary between network C 106 and network E 110; and packet security gateway 118 may be located at the boundary between network D 108 and network E 110. As will be described in greater detail below, each of one or more packet security gateways associated with a security policy management server may be configured to receive a dynamic security policy from the security policy management server, receive packets associated with a network protected by the packet security gateway, and perform a packet transformation function specified by the dynamic security policy on the packets. For example, each of packet security gateways 112, 114, 116, and 118 may be configured to receive a dynamic security policy from security policy management server 120. Each of packet security gateways 112, 114, 116, and 118 may also be configured to receive packets respectively associated with networks A-D 102, 104, 106, and 108. Each of packet security gateways 112, 114, 116, and 118 may further be configured to perform a packet transformation function specified by the dynamic security policy received from security policy management server 120 on the packets respectively associated with networks A-D 102, 104, 106, and 108.

Figure 2:
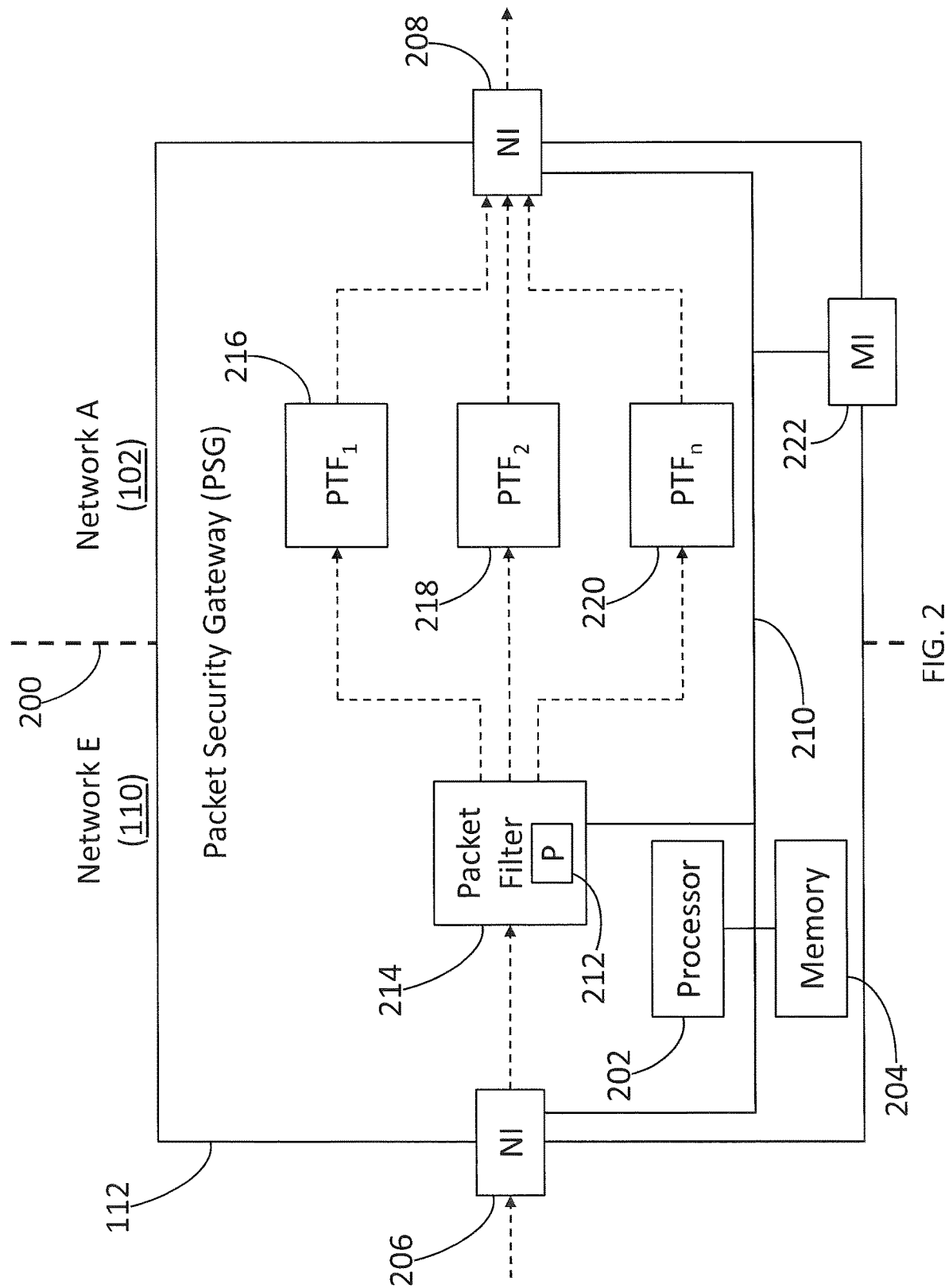
FIG. 2 illustrates an exemplary packet security gateway.

FIG. 2 illustrates an exemplary packet security gateway according to one or more aspects of the disclosure. Referring to FIG. 2, as indicated above, packet security gateway 112 may be located at network boundary 200 between network A 102 and network E 110. Packet security gateway 112 may include processor 202, memory 204, network interfaces 206 and 208, packet filter 214, and management interface 222. Processor 202, memory 204, network interfaces 206 and 208, packet filter 214, and management interface 222 may be interconnected via data bus 210. Network interface 206 may connect packet security gateway 112 to network E 110. Similarly, network interface 208 may connect packet security gateway 112 to network A 102. Memory 204 may include one or more program modules that when executed by processor 202, configure packet security gateway 112 to perform various functions as described herein.

Packet security gateway 112 may be configured to receive a dynamic security policy from security policy management server 120. For example, packet security gateway 112 may receive dynamic security policy 212 from security policy management server 120 via management interface 222 (i.e., out-of-band signaling) or network interface 206 (i.e., in-band signaling). Packet security gateway 112 may include one or more packet filters or packet discriminators, or logic for implementing one or more packet filters or packet discriminators. For example, packet security gateway 112 may include packet filter 214, which may be configured to examine information associated with packets received by packet security gateway 112 and forward the packets to one or more packet transformation functions based on the examined information. For example, packet filter 214 may examine information associated with packets received by packet security gateway 112 (e.g., packets received from network E 110 via management interface 222 or network interface 206) and forward the packets to one or more of packet transformation functions 1-N 216, 218, and 220 based on the examined information.

As will be described in greater detail below, dynamic security policy 212 may include one or more rules and the configuration of packet filter 214 may be based on one or more of the rules included in dynamic security policy 212. For example, dynamic security policy 212 may include one or more rules specifying that packets having specified information should be forwarded to packet transformation function 216, while all other packets should be forwarded to packet transformation function 218. Packet transformation functions 1-N 216, 218, and 220 may be configured to perform one or more functions on packets they receive from packet filter 214. For example, packet transformation functions 1-N 216, 218, and 220 may be configured to forward packets received from packet filter 214 into network A 102, forward packets received from packet filter 214 to an IPsec stack having an IPsec security association corresponding to the packets, or drop packets received from packet filter 214. In some embodiments, one or more of packet transformation functions 1-N 216, 218, and 220 may be configured to drop packets by sending the packets to a local "infinite sink" (e.g., the /dev/null device file in a UNIX/LINUX system).

In some embodiments, packet security gateway 112 may be configured in a network layer transparent manner. For example, packet security gateway 112 may be configured to utilize one or more of network interfaces 206 and 208 to send and receive traffic at the link layer. One or more of network interfaces 206 and 208, however, may not be addressed at the network layer. Because packet filter 214 and packet transformation functions 1-N 216, 218, and 220 operate at the network layer, PSG 112 may still perform packet transformation functions at the network layer. By operating in a network layer transparent manner, packet security gateway 112 may insulate itself from network attacks (e.g., DDoS attacks) launched at the network layer because attack packets cannot be routed to the network interfaces 206 and 208. In some embodiments, packet security gateway 112 may include management interface 222. Management interface 222 may be addressed at the network level in order to provide packet security gateway 112 with network level addressability. Access to management interface 222 may be secured, for example, at the application level by using a service such as SSH, or secured at the transport level using, e.g., TLS, or secured at the network level by attaching it to a network with a separate address space and routing policy from network A 102 and network E 110, or secured at the link level, e.g., using the IEEE 802.1X framework, etc.

The flows illustrated by FIG. 2 are merely exemplary and show packets that originate within a network distinct from network A 102 and are destined for a host within network A 102 in order to simplify the illustration. Packet security gateway 112 may be configured to receive and filter packets that originate within a network other than network A 102 (e.g., networks B-E 104, 106, 108, or 110) and are destined for a host within network A 102, as well as packets that originate within network A 102 destined for a network distinct from network A 102 (e.g., network B-D 104, 106, 108, or 110). That is, packet security gateway 112 may be configured to filter and perform one or more packet transformation functions on packets flowing in either direction and may thus be utilized, for example, to both protect network A 102 from malicious network traffic and to prevent malicious network traffic from leaving network A 102.

FIG. 3 illustrates an exemplary dynamic security policy in accordance with one or more embodiments. Referring to FIG. 3, dynamic security policy 300 may include rules 1-5 302, 304, 306, 308, and 310. Each rule may specify criteria and one or more packet transformation functions that should be performed for packets associated with the specified criteria. The specified criteria may take the form of a five-tuple of values selected from packet header information, specifying a protocol type of the data section of the IP packet (e.g., TCP, UDP, ICMP, or any other protocol), one or more source IP addresses, one or more source port values, one or more destination IP addresses, and one or more destination ports. For example, rule 1 302 may specify that IP packets containing TCP packets, originating from a source IP address that begins with 140, having any source port, destined for an IP address that begins with 130, and destined for port 20 should have an accept packet transformation function (e.g., the identity function) performed on them. Similarly, rule 2 304 may specify that IP packets containing TCP packets, originating from a source IP address that begins with 140, having any source port, destined for any IP address, and destined for port 80 should have an accept packet transformation function performed on them; rule 3 306 may specify that IP packets containing TCP packets, originating from a source IP address that begins with 150, having any source port, destined for any IP address that begins with 120, and destined for port 90 should have an accept packet transformation function performed on them; rule 4 308 may specify that IP packets containing UDP packets, originating from a source IP address that begins with 150, having any source port, destined for any IP address, and destined for port 3030 should have an accept packet transformation function performed on them; and rule 5 310 may specify that IP packets containing any data, originating from any source IP address, having any source port, destined for any IP address, and destined for any port should have a deny packet transformation function performed on them. One or more rules included in dynamic security policy 300 may be specified in IP version 4 or IP version 6.

As will be described in greater detail below, dynamic security policy 300 may include one or more rules that specify a packet transformation function other than forwarding (accepting or allowing) or dropping (denying) a packet. For example, rule 3 306 may specify that IP packets containing TCP packets, originating from a source IP address that begins with 150, having any source port, destined for any IP address that begins with 120, and destined for port 90 should not only have an accept packet transformation function performed on them, but should also be routed to a monitoring device.

One or more rules within dynamic security policy 300 may be required to execute in a specific order. For example, it may be required that rule 5 310 be executed last. Because rule 5 310 specifies that any packet should have a deny packet transformation function performed on it, if it were executed before a rule specifying an accept packet transformation function (e.g., one or more of rules 1-4 302, 304, 306, or 308), no packets matching the criteria specified by the rule specifying the accept packet transformation function would pass through a packet security gateway implementing dynamic security policy 300. Similarly, two or more rules within dynamic security policy 300 may specify overlapping criteria and different packet transformation functions. In such cases, the order-of-application of the rules may determine which rule is applied to a packet that would match the two or more rules. Such rules may be merged together or otherwise transformed into a different set of rules without overlapping criteria, which may produce the same result as the original set of rules, when applied to any packet.

A dynamic security policy may utilize the combination of one or more rules to create policies for governing packets within a network environment or effectuating one or more services within a network environment. For example, a dynamic security policy may include one or more rules, the combination of which may effectuate a blocklist service within a network environment. A dynamic security policy that effectuates a blocklist service within a network environment may include one or more rules specifying criteria (e.g., a set of network addresses) for which associated packets should be blocked, dropped, or denied, and at least one rule specifying that all packets outside the specified block sets should be forwarded, accepted, or allowed. Such a dynamic security policy may be constructed by including one or more rules specifying criteria (e.g., a set of network addresses) for which associated packets should be dropped, and a wildcard rule, designated to be executed last, and specifying that all packets should be allowed. One or more dynamic security policies that effectuate a blocklist service may be utilized to implement one or more Virtual Private Networks (VPNs).

A dynamic security policy may also include one or more rules, the combination of which may effectuate an allowlist service within a network environment. A dynamic security policy that effectuates an allowlist service within a network environment may include one or more rules specifying criteria (e.g., a set of network addresses) for which associated packets should be forwarded, allowed, or accepted, and at least one rule specifying that all packets outside the specified allow sets should be blocked, denied, or dropped. Such a dynamic security policy may be constructed by including one or more rules specifying criteria (e.g., a set of network addresses) for which associated packets should be forwarded, and a wildcard rule, designated to be executed last, and specifying that all packets should be blocked. For example, dynamic security policy 300 includes rules 1-4 302, 304, 306, and 308, each of which specifies a set of network addresses for which packets should be allowed, and rule 5 310 which specifies that all packets should be dropped. Thus, if rules 1-5 302, 304, 306, 308, and 310 are executed in order, dynamic security policy 300 will effectuate an allowlist service.

A dynamic security policy may also include one or more rules, the combination of which may effectuate a VoIP firewall service within a network environment. As will be discussed in greater detail below, a security policy management server may receive information associated with VoIP sessions. For example, a security policy management server may receive information associated with VoIP sessions from one or more softswitches (e.g., H.323 softswitches, SIP IP Multimedia Subsystem (IMS) softswitches) or session border controllers when a VoIP session is initialized or set up. In order to allow packets associated with such a VoIP session within a network protected by one or more packet security gateways associated with the security policy management server, the security policy management server may utilize the received information associated with the VoIP sessions to construct one or more rules for allowing the packets associated with the VoIP session. When the VoIP session is terminated or torn down, the softswitch or session border controller may notify the security policy management server, which may create or alter one or more rules to reflect the termination of the VoIP session (e.g., to deny future packets which may match criteria previously associated with the VoIP session).

A dynamic security policy may also include one or more rules or rule sets, the combination of which may effectuate a phased restoration service within a network environment. Such a phased restoration service may be used in the event of a network attack (e.g., a DDoS attack). When an attack occurs a network may be overwhelmed with network traffic and be unable to route all or any of the traffic. In the event of such an attack, it may be beneficial to utilize a dynamic security policy which effectuates a phased restoration service. Such a dynamic security policy may include one or more rules or rule sets configured for execution in time-shifted phases. Each of the rules or rule sets may specify progressively larger sets of network addresses. For example, a dynamic security policy may include three rules or rule sets which may be configured for execution in time-shifted phases. A first of the rules or rule sets may specify a relatively small set of network addresses for which packets should be forwarded (e.g., network addresses corresponding to mission critical network devices). A second of the rules or rule sets may specify a relatively larger set of network addresses for which packets should be forwarded (e.g., network addresses corresponding to trusted network devices). A third of the rules or rule sets may specify an even larger set of network addresses for which packets should be forwarded (e.g., network addresses corresponding to all network devices that would be allowed under ordinary circumstances). The dynamic security policy may specify that the rules or rule sets should be implemented in time-shifted phases. That is, the dynamic security policy may specify that the first rule or rule set should be executed first, and that the second rule or rule set should be executed at a time after the time at which the first rule or rule set is executed, and the third rule or rule set should be executed at a time after the time at which the second rule or rule set is executed. Such a dynamic security policy may assist a network in recovering from an attack, by allowing the network to isolate itself from the attack or recover in a controlled manner.

A dynamic security policy may also include one or more rules, the combination of which may effectuate an enqueueing service within a network environment. A dynamic security policy that effectuates an enqueueing service may include one or more rules that specify sets of network addresses and packet transformation functions that queue packets in one or more queues corresponding to the sets. These queues may then be serviced at varying rates. For example, a dynamic security policy may include two rules, each of which specify a set of network addresses. A first of the rules may specify that packets corresponding to its specified set should be queued in a first forwarding queue. A second of the rules may specify that packets corresponding to its specified set should be queued in a second forwarding queue. The first forwarding queue may be serviced at a higher forwarding rate than the second forwarding queue. Such an enqueueing service may be utilized during or following a network attack, or generally to provide prioritized service to critical network devices (e.g., when network resources are strained). In some embodiments, one or more rules contained within a dynamic security policy may include an arbitrary selector which may correspond to one or more parameters or fields associated with a packet. For example, a dynamic security policy rule may include a Differentiated Service Code Point (DSCP) selector that corresponds to a DSCP field in an IP header. Thus, two packets having different values within the specified DSCP field may correspond to two distinct rules within a dynamic security policy and have different packet transformation functions performed on them. For example, two otherwise identical packets having different values within the specified DSCP field may be queued in two different forwarding queues that have different forwarding rates, and may thus receive differentiated service.

A dynamic security policy may also include one or more rules, the combination of which may effectuate a multi-dimensional routing service or a multi-dimensional switching service within a network environment. For example, in some embodiments, a dynamic security policy may include one or more rules that specify a set of network addresses and an additional parameter. Such rules may further specify a packet transformation function configured to route packets within the specified set of network addresses that match the additional parameter to a network address distinct from the packets' respective destination network addresses. For example, the packet transformation function may be configured to encapsulate such packets (e.g., as described by Internet Engineering Task Force (IETF) Request For Comment (RFC) 2003) with an IP header specifying a network address different from their respective destination addresses. The packets may then be routed to the network address specified by the encapsulating IP header, which may correspond to a network device configured to utilize such packets or data contained within them, strip the IP header from the packets, and forward the packets to their respective destination addresses. In some embodiments, the packet transformation function may be configured to alter or modify the destination address of the packets, which may then be routed to the altered or modified destination address. Additionally or alternatively, the packet transformation function may be configured to assign such packets to a particular Layer-2 VLAN (e.g., as described by IEEE 802.1Q). The packets may then be switched to another device on the same VLAN, which may or may not be on the IP-layer path that the packet would have taken if it were routed according to the packet's destination IP address instead of being switched through the VLAN.

As will be described in greater detail below, in some embodiments a dynamic security policy may include one or more rules, the combination of which may effectuate an implementation of a multi-dimensional routing service for performing a monitoring service within a network environment. For example, a dynamic security policy may include one or more rules that specify a set of network addresses (e.g., a set of network addresses from which a call that is to be monitored is expected to originate within) and an additional parameter (e.g., a SIP URI corresponding to a caller to be monitored). As indicated above, such rules may further specify a packet transformation function configured to route or switch packets within the specified set of network addresses that match the additional parameter (e.g., the SIP URI) to a network address corresponding to a monitoring device. The network address corresponding to the monitoring device may be different from the packets' destination network address (e.g., an address corresponding to the called party or a softswitch associated with the called party). For example, the packet transformation function may be configured to encapsulate the packets with an IP header specifying the network address corresponding to the monitoring device. The packets may then be routed (or rerouted) to the monitoring device, which may be configured to copy the packets or data contained within them (e.g., for subsequent review by a law enforcement or national security authority), strip the IP header from them, and then forward the packets to their destination address (e.g., the address corresponding to the called party or softswitch associated with the called party).

As indicated above, a significant challenge associated with building a scalable proactive solution for protecting a secured network, is the need to filter substantially all network traffic at a high resolution. Filtering traffic at a high resolution often requires the use of many rules. In a large network, where traffic volumes may be enormous, the time required to provide high resolution filtering (e.g., the time required to apply a large number of rules to a large volume of traffic) has traditionally been thought to render proactive network protection solutions infeasible. This concern may be particularly acute in network environments that utilize low-latency applications (e.g., VoIP).

Recent advances in packet filtering technology have reduced the time required to apply large rule sets to network traffic. For example, U.S. Patent Application Publication Nos. 2006/0195896 and 2006/0248580 to Fulp et al., and U.S. Patent Application Publication No. 2011/0055916 to Ahn, describe advanced packet filtering technologies, and are each incorporated by reference herein in their entireties.

One approach to providing high resolution filtering, while reducing the number of rules applied to network traffic, may be utilized when a dynamic security policy is combinatorially complete. For example, a dynamic security policy may be configured to allow bi-directional communication between a set of N internal hosts $\{I_1, I_2, \ldots, I_N\}$ within a protected network and a set of M external hosts $\{E_1, E_2, \ldots, E_M\}$ outside the protected network. To enable communications between the internal hosts and the external hosts, the dynamic security policy may be constructed to include a set of rules containing each possible combination of internal hosts and external hosts (e.g., $\{\{I_1, E_1\}, \{I_1, E_2\}, \ldots \{I_1, E_M\}, \{I_2, E_1\}, \{I_2, E_2\}, \ldots \{I_2, E_M\}, \ldots, \{I_N, E_1\}, \{I_N, E_2\}, \ldots \{I_N, E_M\}\}$), each of the rules being associated with an allow packet transformation function. Such a dynamic security policy would have N*M rules for allowing communication between the internal hosts and the external hosts that originate from one of the internal hosts and are destined for one of the external hosts, and an additional N*M rules for allowing communications between the internal hosts and the external hosts that originate from one of the external hosts and are destined for one of the internal hosts. An equivalent result may be achieved, however, by constructing two smaller dynamic security policies: a first dynamic security policy that includes rules specifying the N internal hosts (e.g., $\{\{I_1\}, \{I_2\}, \ldots, \{I_N\}\}$), each rule being associated with an accept packet transformation function; and a second dynamic security policy that includes rules specifying the M external hosts (e.g., $\{\{E_1\}, \{E_2\}, \ldots, \{E_M\}\}$), each rule being associated with an accept packet transformation function. Such a construct of dynamic security policies may be implemented using a system of packet security gateways configured in series.

Figure 4:
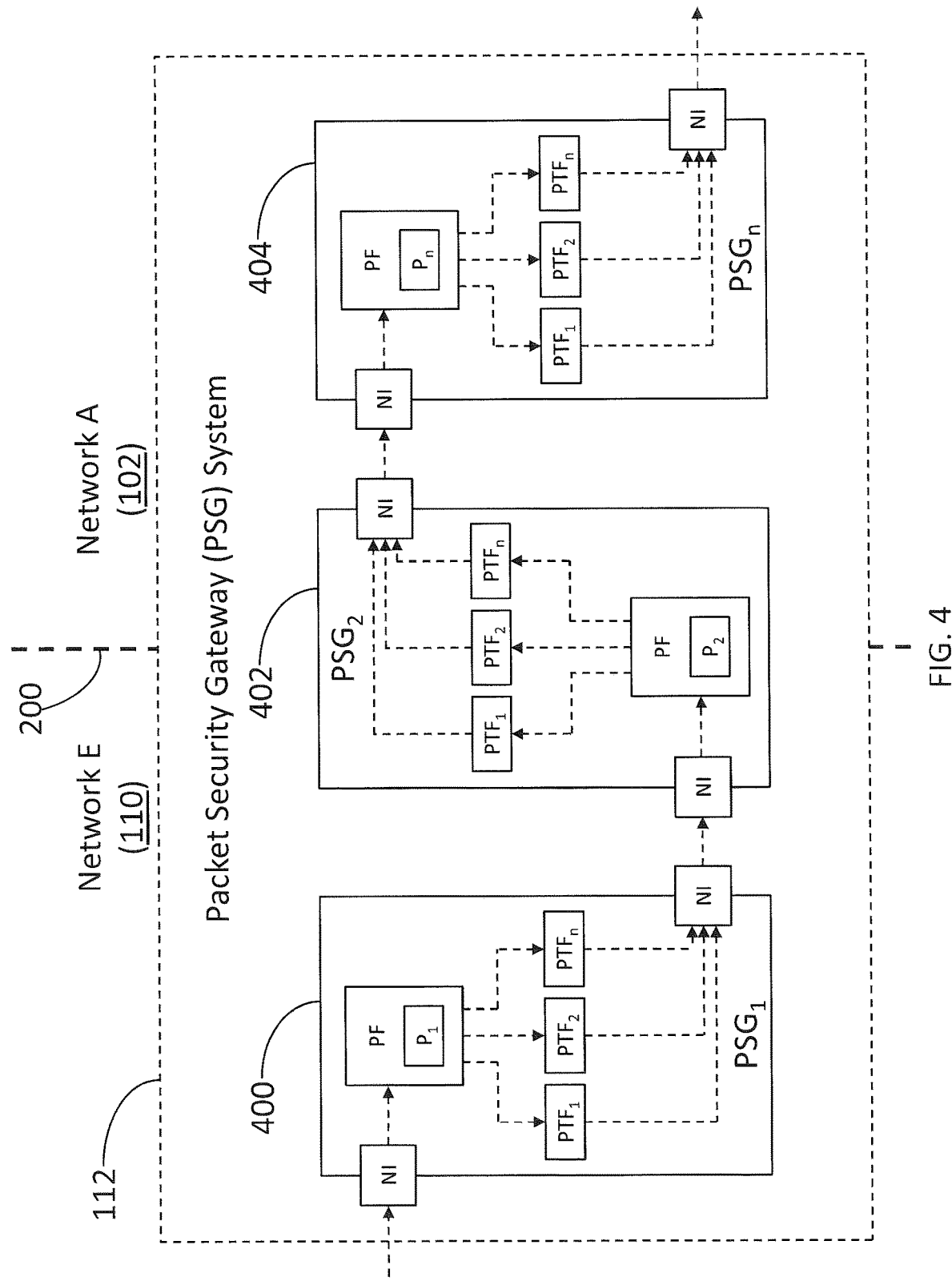
FIG. 4 illustrates an exemplary configuration of multiple packet security gateways in series.

FIG. 4 illustrates an exemplary configuration of multiple packet security gateways connected in series. Referring to FIG. 4, packet security gateway 112 may include one or more packet security gateways configured in series. For example, packet security gateway 112 may include packet security gateways 1-N 400, 402, and 404. Packet security gateways 1-N 400, 402, and 404 may be configured so that packets forwarded by packet security gateway 1 400 are received by packet security gateway 2 402, and packets forwarded by packet security gateway 2 402 are received by the next packet security gateway in the series, all the way through packet security gateway N 404. Each of packet security gateways 1-N 400, 402, and 404 may include a packet filter, similar to packet filter 214 described above with respect to FIG. 2, and one or more packet transformation functions, similar to packet transformation functions 1-N 216, 218, and 220 described above with respect to FIG. 2. Packet security gateways 1-N 400, 402, and 404 may be utilized to implement a construct of dynamic security policies similar to that described above.

For example, packet security gateway 1 400 may be configured to implement $P_1$, which may include rules specifying M external hosts (e.g., $\{\{E_1\}, \{E_2\}, \ldots, \{E_M\}\}$), each rule being associated with an accept packet transformation function. Packet security gateway 2 402 may be configured to implement $P_2$, which may include rules specifying N internal hosts (e.g., $\{\{I_1\}, \{I_2\}, \ldots, \{I_N\}\}$), each rule being associated with an accept packet transformation function. A packet received by packet security gateway 112 may be initially received via packet security gateway 1 400's network interface. Packet security gateway 1 400 may apply one or more of the rules in $P_1$ to the received packet until the packet matches criteria specified by a rule in $P_1$, at which point packet security gateway 1 400 may perform a packet transformation function specified by the rule on the packet. For example, a packet may be received by packet security gateway 112 that originates from external host $E_5$ (e.g., a host within network E 110) and is destined for internal host $I_7$ (e.g., a host within network A 102). Packet security gateway 1 400 may apply one or more of the rules in $P_1$ (e.g., $\{\{E_1\}, \{E_2\}, \ldots, \{E_M\}\}$) to the received packet and the received packet may match the criteria specified by one of the rules in $P_1$ (e.g., $\{\{E_5\}\}$). The rule may specify that an accept packet transformation function should be performed, and packet security gateway 1 400 may utilize one or more of its packet transformation functions to perform the accept packet transformation function on the packet and forward the packet to packet security gateway 2 402. Packet security gateway 2 402 may apply one or more of the rules in $P_2$ (e.g., $\{\{I_1\}, \{I_2\}, \ldots, \{I_N\}\}$) to the packet and the packet may match the criteria specified by one of the rules in $P_2$ (e.g., $\{\{I_7\}\}$). The rule may specify that an accept packet transformation function should be performed, and packet security gateway 2 402 may utilize one or more of its packet transformation functions to perform the accept packet transformation function on the packet and forward the packet to network A 102.

It will be appreciated that utilizing multiple packet security gateways in series to implement dynamic security policy constructs may increase performance and decrease memory resource requirements. For example, in the described scenario packet security gateway 1 400 may have only been required to compare the packet to five rules and packet security gateway 2 402 may have only been required to compare the packet to seven rules. In a worst case scenario, packet security gateway 1 400 may have only been required to compare the packet to M rules and packet security gateway 2 402 may have only been required to compare the packet to N rules. Moreover, the series configuration may enable packet security gateway 1 400 to begin implementing $P_1$ with respect to a subsequently received packet, while packet security gateway 2 402 simultaneously implements $P_2$ with respect to the packet forwarded by packet security gateway 1 400. Furthermore, the memory requirements for this scenario with packet security gateways in series may be comparable to M+N, whereas originally the combinatorially complete set of rules contained in a single packet security gateway may have required memory comparable to N*M.

Figure 5:
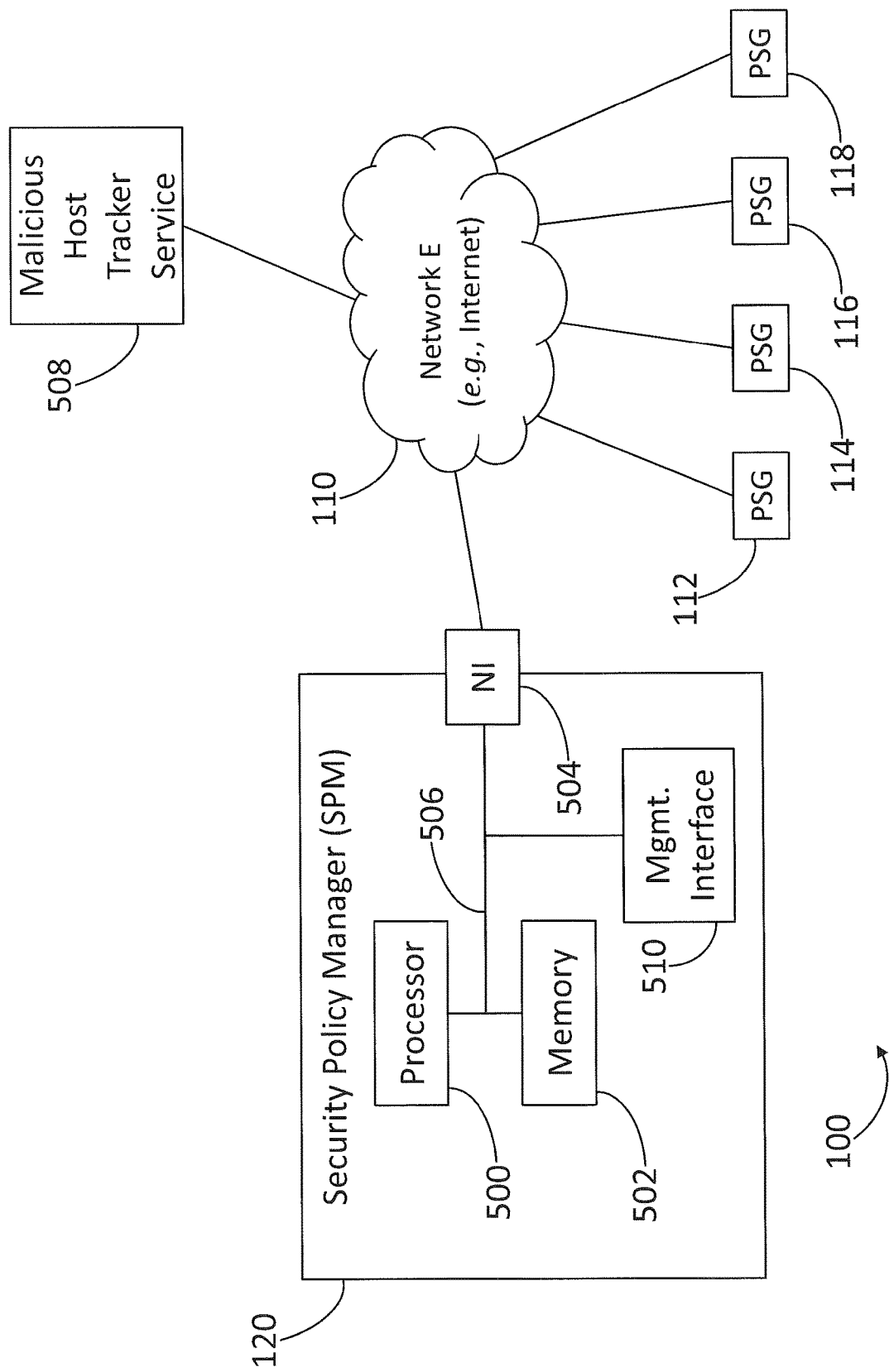
FIG. 5 illustrates an exemplary security policy management server.

FIG. 5 illustrates an exemplary security policy management server. Referring to FIG. 5, security policy management server 120 may include processor 500, memory 502, and network interface 504. One or more of processor 500, memory 502, and network interface 504 may be interconnected via data bus 506. Network interface 504 may interface security policy management server 120 with network E 110. Memory 502 may include one or more program modules that when executed by processor 500, configure security policy management server 120 to perform functions described herein. It will be appreciated that as used herein the term "server" designates one or more computing devices configured to perform one or more functions described herein. The term "server" should not be construed to imply that a client/server relationship (e.g., a relationship in which a request is received from a client and then serviced by a server) necessarily exists.

Security policy management server 120 may be configured to communicate one or more dynamic security policies to one or more packet security gateways within network environment 100. For example, security policy management server 120 may communicate one or more dynamic security policies stored in memory 502 to one or more of packet security gateways 112, 114, 116, and 118. For example, security policy management server 120 may be configured to communicate one or more dynamic security policies to one or more of packet security gateways 112, 114, 116, and 118 on a periodic basis, under specified network conditions, whenever security policy management server 120 receives a new dynamic security policy, whenever a dynamic security policy stored on security policy management server 120 is changed or altered, or in response to a request from one or more of packet security gateways 112, 114, 116, and 118.

Security policy management server 120 may also be configured to provide one or more administrators associated with security policy management server 120 with management interface 510. For example, security policy management server 120 may be configured to provide one or more administrators with a Graphical User Interface (GUI) or Command Line Interface (CLI). An administrator of security policy management server 120 may utilize security policy management server 120's management interface 510 to configure security policy management server 120. For example, an administrator may configure security policy management server 120 in order to associate security policy management server 120 with one or more of packet security gateways 112, 114, 116, and 118. An administrator of security policy management server 120 may also utilize security policy management server 120's management interface 510 to construct one or more dynamic security policies or to load one or more dynamic security policies into security policy management server 120's memory 502. For example, an administrator associated with security policy management server 120 may manually construct one or more dynamic security policies offline and then utilize security policy management server 120's management interface 510 to load such dynamic security policies into security policy management server 120's memory 502.

In some embodiments, security policy management server 120 may be configured to add, remove, or alter one or more dynamic security policies stored in memory 502 based on information received from one or more devices within network environment 100. For example, security policy management server 120's memory 502 may include a dynamic security policy having one or more rules that specify a list of network addresses known to be associated with malicious network traffic. Security policy management server 120 may be configured to automatically create or alter one or more of such rules as new network addresses associated with malicious network traffic are determined. For example, security policy management server 120 may receive updates (e.g. as part of a subscription) from malicious host tracker service 508. Malicious host tracker service 508 may aggregate information associated with malicious network traffic and updates received from malicious host tracker service 508 may include one or more network addresses that have been determined to be associated with malicious network traffic. Security policy management server 120 may be configured to create or alter one or more rules included within a dynamic security policy associated with malicious host tracker service 508 to block traffic associated with the network addresses received from malicious host tracker service 508. Additionally or alternatively, as indicated above, security policy management server 120 may be configured to create or alter one or more dynamic security policies, or one or more rules included in one or more dynamic security policies, to account for VoIP sessions being initiated or terminated by a network device within network environment 100.

Figure 6:
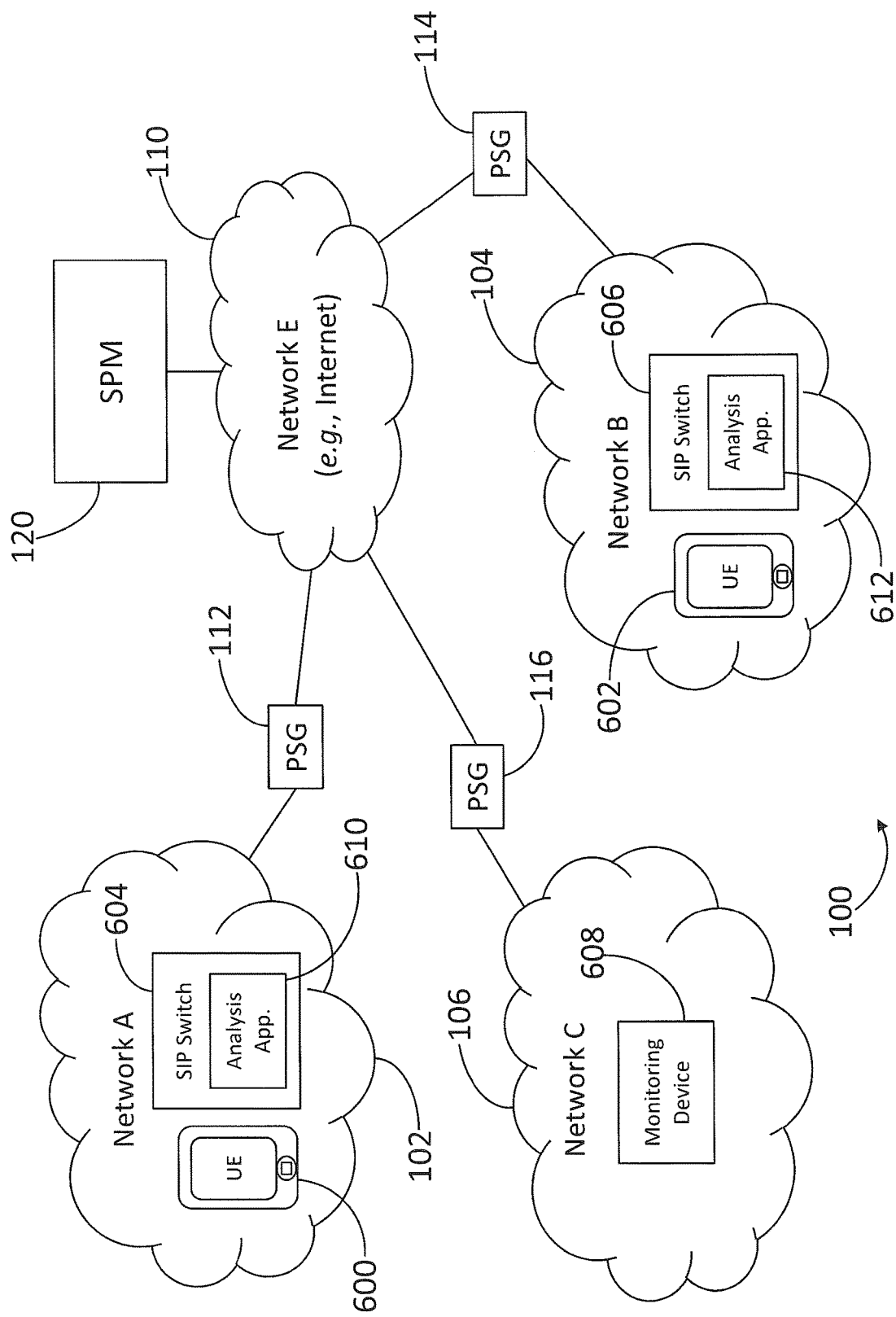
FIG. 6 illustrates an exemplary network environment for implementing a monitoring service.

As indicated above, a dynamic security policy may include one or more rules, the combination of which may effectuate an implementation of a multi-dimensional routing service for performing a monitoring service within a network environment. FIG. 6 illustrates an exemplary network environment for implementing a monitoring service in accordance with one or more embodiments. Referring to FIG. 6, a user of network environment 100 (e.g., a law enforcement or national security authority) may desire to obtain a copy of packets associated with one or more VoIP sessions (e.g., sessions associated with SIP URI exampleuser@exampledomain.com) within network environment 100. Because many SIP-signaled services are designed to address sessions dynamically, it may not be possible to determine, prior to a session being set up, a particular network address and port from which packets should be copied. Moreover, due to privacy concerns, regulators may require that only packets associated with the specified VoIP sessions (e.g., sessions associated with SIP URI exampleuser@exampledomain.com) be copied.

For example, a user associated with SIP URI exampleuser@exampledomain.com may utilize User Equipment (UE) 600 within network A 102 to place a VoIP call to a user utilizing UE 602 within network B 104. SIP switch 604 may be utilized by an operator of network A 102 for switching SIP signals within network A 102. Similarly, SIP switch 606 may be utilized by an operator of network B 104 for switching SIP signals within network B 104. One or more of SIP switches 604 and 606 may include an analysis application configured to monitor SIP signals and publish SIP messages associated with specified users to one or more subscribers. For example, the operator of network A 102 may have installed analysis application 610 on SIP switch 604 (e.g., accessed via a SIP IMS Service Control (ISC) interface associated with SIP switch 604) and configured analysis application 610 to search for and publish SIP messages associated with SIP URI exampleuser@exampledomain.com to security policy management server 120. Similarly, the operator of network B 104 may have installed analysis application 612 on SIP switch 606 and configured analysis application 612 to publish SIP messages associated with SIP URI exampleuser@exampledomain.com to security policy management server 120.

When the user associated with SIP URI exampleuser@exampledomain.com utilizes UE 600 to place a VoIP call to the user utilizing UE 602, analysis application 610 may detect one or more SIP signaling messages associated with the call (e.g., SIP signaling messages for setting up the call) and publish the messages to security policy management server 120. Security policy management server 120 may extract one or more network addresses and port numbers from the SIP signaling messages (e.g., a network address and port number utilized by UE 600 for placing the VoIP call to UE 602). Security policy management server 120 may utilize the extracted network addresses and port numbers to create a new dynamic security policy or alter one or more rules within an existing dynamic security policy. For example, security policy management server 120 may construct a new dynamic security policy that includes a rule specifying one of the extracted network addresses and port numbers, as well as a packet transformation function configured to route associated packets to monitoring device 608. Security policy management server 120 may communicate the new or modified dynamic security policy to packet security gateway 112.

When packets associated with the VoIP call between UE 600 and UE 602 are received by packet security gateway 112, packet filter 214 may identify the packets as matching the criteria specified by the dynamic security policy received from security policy management server 120 (e.g., packets addressed to or from the extracted address and port number) and may perform the packet transformation function configured to route the packets to monitoring device 608. For example, the packet transformation function configured to route the packets to monitoring device 608 may be packet transformation function 2 218. When packet transformation function 2 218 receives the packets from packet filter 214, it may encapsulate them with an IP header having an address corresponding to monitoring device 608 and may then forward them to network E 110. Once forwarded, the packets may be routed based on the address specified by the encapsulating header, and may thus be communicated to monitoring device 608. When the packets are received by monitoring device 608, monitoring device 608 may copy the packets or data contained within them, and strip the encapsulating header from them. Monitoring device 608 may then forward the packets, without the encapsulating header, to network E 110. Network E 110 may receive the packets forwarded by monitoring device 608 and may route them based on their destination address (e.g., to UE 602).

In some embodiments, packet security gateway 112 may be configured to perform multiple packet transformation functions on the packets associated with the VoIP call between UEs 600 and 602. For example, packet filter 214 may identify the packets as matching the criteria specified by the dynamic security policy received from security policy management server 120 and may forward the packets to packet transformation functions 1 216 and 2 218. Packet transformation function 1 216 may be configured to forward the packets to their destination address (e.g., to UE 602) and packet transformation function 2 218 may be configured to encapsulate the packets (or a copy of the packets) with an IP header having an address corresponding to monitoring device 608 and then forward the encapsulated packets to network E 110. Once forwarded, the encapsulated packets may be routed based on the address specified by the encapsulating header, and may thus be communicated to monitoring device 608, which may store the packets or data contained within them for subsequent review or analysis (e.g., by a law enforcement or national security authority). In such embodiments, it may not be necessary for monitoring device 608 to strip the encapsulating header from the packets or route them based on their destination address (e.g., to UE 602) because packet transformation function 1 216 may have already forwarded the packets to their destination address (e.g., to UE 602).

It will be appreciated that SIP switch 604's analysis application 610 may similarly detect SIP signaling associated with the termination of the VoIP call between UE 600 and UE 602 and may publish the SIP messages to security policy management server 120. Security policy management server 120 may utilize one or more network addresses and port numbers within the messages to construct a new dynamic security policy or modify one or more rules within an existing dynamic security policy and communicate the new or modified dynamic security policy to packet security gateway 112 in order to ensure that future packets associated with the network address and port number but not associated with SIP URI exampleuser@exampledomain.com are not routed to monitoring device 608. Security policy management server 120 may communicate any dynamic security policy constructed or modified based on SIP messages to any of multiple packet security gateways (e.g., packet security gateways 114 and 116) within network environment 100 in order to ensure that all packets associated with the VoIP call between UE 600 and UE 602 are forwarded to monitoring device 608.

Figure 7:
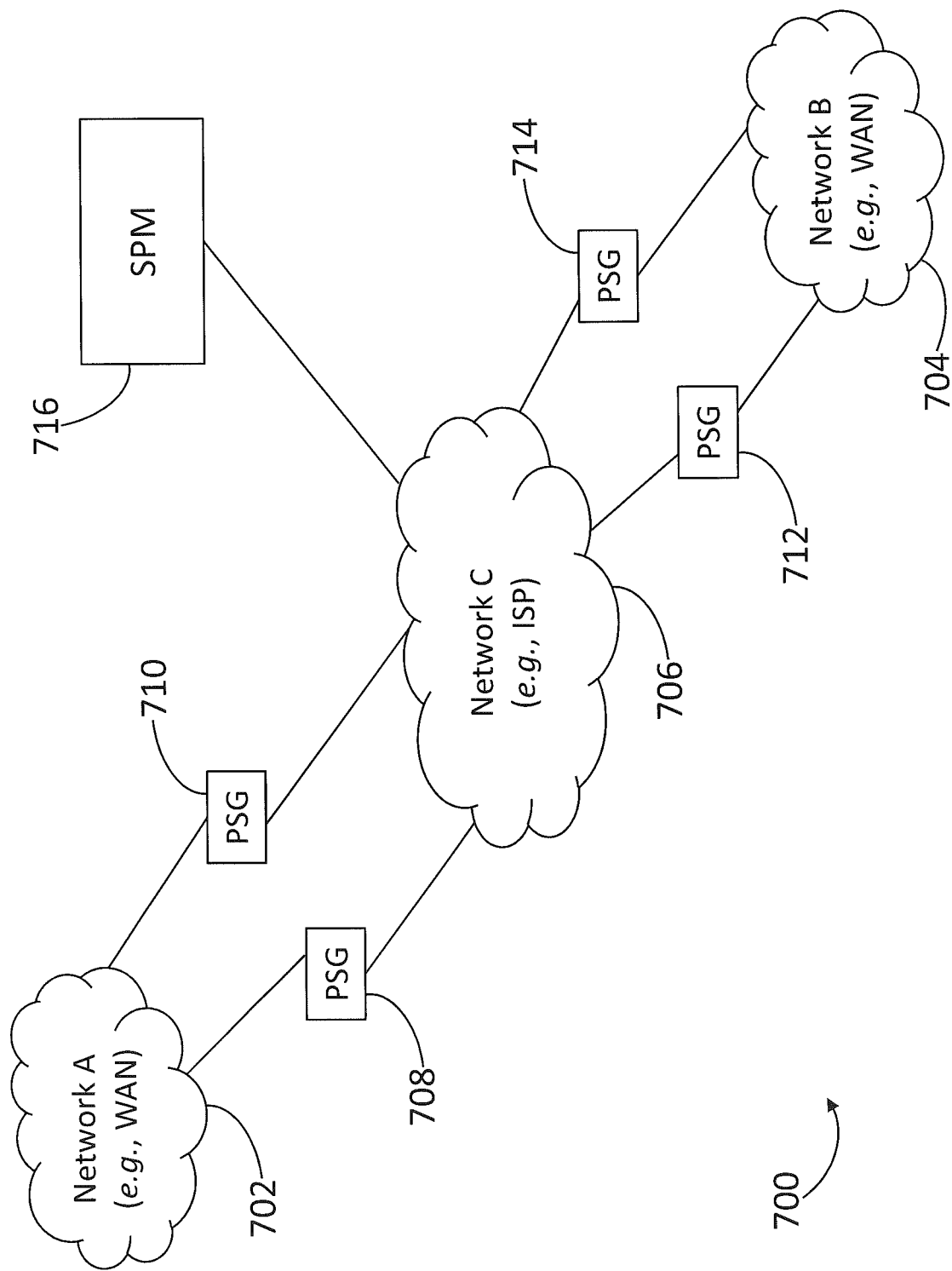
FIG. 7 illustrates an exemplary network environment that includes a secured network having multiple boundaries with unsecured networks.

FIG. 7 illustrates an exemplary network environment that includes a secured network having multiple boundaries with unsecured networks in which one or more embodiments may be implemented. Network environment 700 may include networks A-C 702, 704, and 706. Networks A 702 and B 704 may be a LAN or WAN associated with an organization (e.g., a company, university, enterprise, or government agency). One or more networks within network environment 700 may interface with one or more other networks within network environment 700. For example, the organizations associated with networks A 702 and B 704 may subscribe to an ISP to provide interconnectivity between their respective networks or allow public access to their respective networks (e.g., via the Internet). Each of networks A 702 and B 704 may be connected to network C 706, which may be the ISP's network. The ISP may desire to offer an interconnection service between networks A 702 and B 704, but may also want to enforce one or more dynamic security policies with respect to traffic traversing network C 706. Accordingly, one or more packet security gateways may be located at each boundary between network A 702 and network C 706, and each boundary between network B 704 and network C 706. For example, packet security gateway 708 and packet security gateway 710 may be respectively located at first and second boundaries between networks A 702 and C 706. Similarly, packet security gateways 712 and 714 may be respectively located at first and second boundaries between networks B 704 and C 706. Each of packet security gateways 708, 710, 712, and 714 may be associated with security policy management server 716.

Security policy management server 716 may maintain one or more dynamic security policies configured for protecting network C 706, and may be managed by the ISP associated with network C 706. Security policy management server 716 may ensure that each of packet security gateways 708, 710, 712, and 714 protect each of their respective boundaries with network C 706 in a uniform manner. For example, security policy management server 716 may be configured to communicate one or more dynamic security policies it maintains to each of packet security gateways 708, 710, 712, and 714 on a periodic basis, in response to being directed to by a network operator associated with network environment 700, in response to detected network conditions (e.g., an attack or high resource utilization), or in response to a request from one or more of packet security gateways 708, 710, 712, or 714.

In some embodiments, security policy management server 716 may be configured to communicate different dynamic security policies to one or more of packet security gateways 708, 710, 712, and 714 based on, for example, their respective locations within network environment 700. For example, security policy management server 716 may be configured to implement one or more anti-spoofing techniques (e.g., ingress filtering or Best Current Practice (BCP) 38, as described by Internet Engineering Task Force (IETF) Request For Comment (RFC) 2827) with respect to network environment 700. Effective implementation of such techniques may require that a dynamic security policy be based on the location at which it is being implemented. For example, a dynamic security policy that implements ingress filtering may comprise one or more rules that filter based on a packet's source address, identifying packets having source addresses that could not possibly have originated from a network downstream of the ingress filtering point (e.g., packets having spoofed source addresses). Such rules may vary depending on the boundary point for which they are implemented (e.g., a packet for one boundary may be properly identified as spoofed, yet a packet having the same source address may be legitimate traffic at a different boundary point). Accordingly, security policy management server 716 may be configured to communicate different dynamic security policies to one or more of packet security gateways 708, 710, 712, and 714 based on their respective locations within network environment 700. For example, security policy management server 716 may communicate a dynamic security policy to packet security gateways 708 and 710 that includes one or more rules for performing ingress filtering for network A 702 (e.g., for identifying packets having source addresses that could not have originated within network A 702) and a different dynamic security policy to packet security gateways 712 and 714 that includes one or more rules for performing ingress filtering for network B 704 (e.g., for identifying packets having source addresses that could not have originated within network B 704).

It will be appreciated that by maintaining uniform dynamic security policies at each boundary between networks A 702 and C 706, as well as at each boundary between networks B 704 and C 706, security policy management server 716 and packet security gateways 708, 710, 712, and 714 may aid the ISP associated with network C 706 in protecting network C 706 from network attacks.

Figure 8:
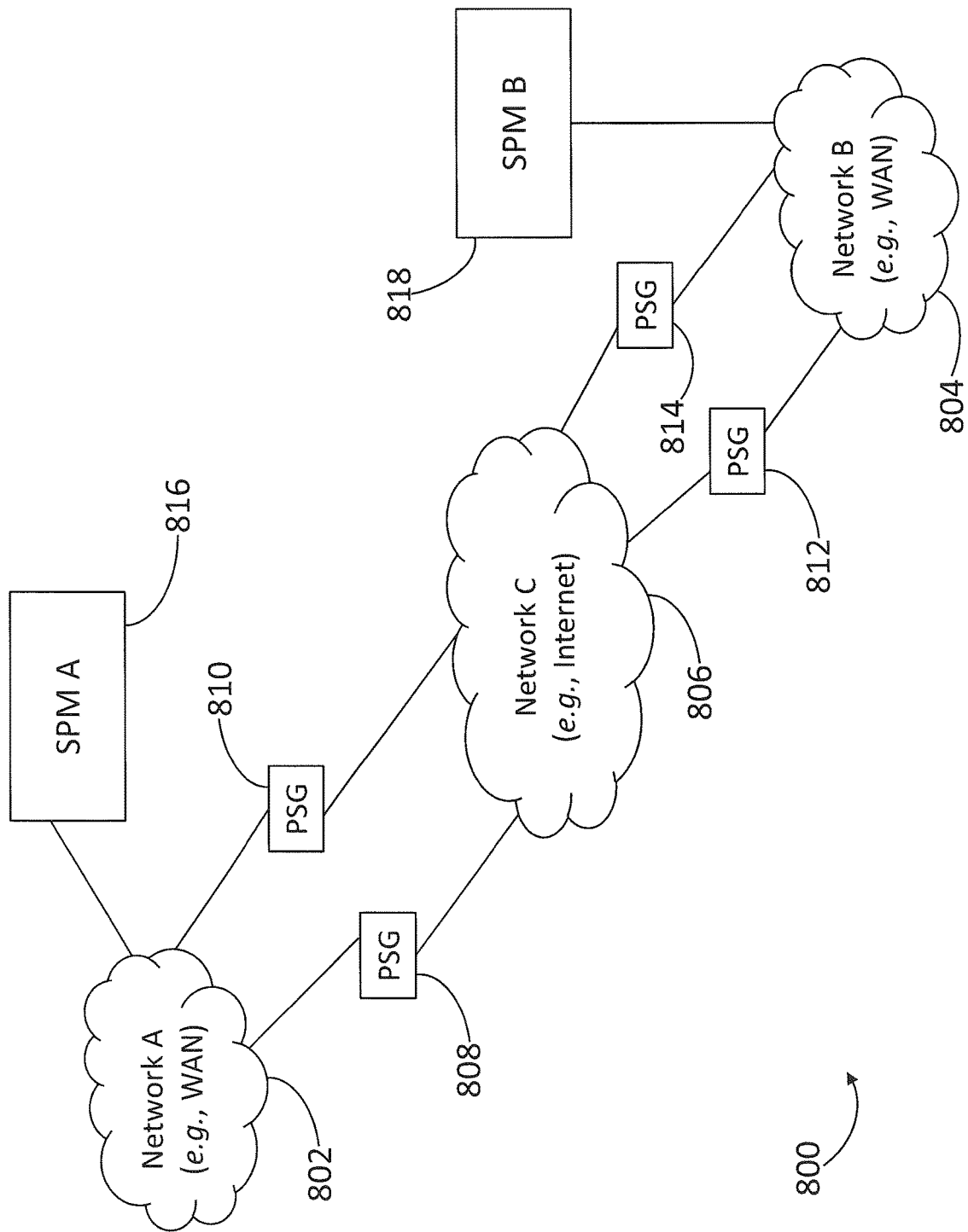
FIG. 8 illustrates an exemplary network environment that includes multiple distinct secured networks.

FIG. 8 illustrates an exemplary network environment that includes multiple distinct secured networks in which one or more embodiments may be implemented. Referring to FIG. 8, network environment 800 may include networks A 802, B 804, and C 806. Each of networks A 802 and B 804 may interface with network C 806 at multiple boundaries within network environment 800. Packet security gateways 808 and 810 may be respectively located at first and second boundaries between networks A 802 and C 806. Similarly, packet security gateways 812 and 814 may be respectively located at first and second boundaries between networks B 804 and C 806.

Network A 802 and B 804 may both be associated with a common organization (e.g., a company, university, enterprise, or government agency), or may each be associated with a distinct organization. In the former case, the common organization may desire to utilize one or more dynamic security policies with respect to network A 802 and one or more different dynamic security policies with respect to network B 804. In the latter case, an organization associated with network A 802 may desire to utilize one or more dynamic security policies with respect to network A 802 and a different organization associated with network B 804 may desire to utilize one or more different dynamic security policies with respect to network B 804. Network environment 800 may include security policy management servers A 816 and B 818. Security policy management server A 816 may be associated with network A 802 and may maintain one or more dynamic security policies configured for protecting network A 802. Similarly, security policy management server B 818 may be associated with network B 804 and may maintain one or more dynamic security policies configured for protecting network B 804.

Packet security gateways 808 and 810 may be associated with security policy management server A 816. Similarly, packet security gateways 812 and 814 may be associated with security policy management server B 818. Security policy management server A 816 may ensure that packet security gateways 808 and 810 protect each of their respective boundaries with network C 806 in a uniform manner. For example, security policy management server A 816 may be configured to communicate one or more dynamic security policies it maintains to packet security gateways 808 and 810 on a periodic basis, in response to being directed to by a network operator associated with network A 802, in response to detected network conditions (e.g., an attack or high resource utilization), or in response to a request from packet security gateway 808 or 810. Similarly, security policy management server B 818 may ensure that packet security gateways 812 and 814 protect each of their respective boundaries with network C 806 in a uniform manner. For example, security policy management server B 818 may be configured to communicate one or more dynamic security policies it maintains to packet security gateways 812 and 814 on a periodic basis, in response to being directed to by a network operator associated with network B 804, in response to detected network conditions (e.g., an attack or high resource utilization), or in response to a request from packet security gateway 812 or 814. By utilizing distinct security policy management servers (e.g., security policy management servers A 816 and B 818), one or more operators associated with distinct networks (e.g., networks A 802 and B 804) may maintain uniform dynamic security policies at each boundary of their respective networks, while simultaneously enabling different dynamic security policies to be maintained for each network. Similarly, by utilizing distinct security policy management servers (e.g., security policy management servers A 816 and B 818), one or more operators associated with a single organization that desires to maintain distinct networks (e.g., networks A 802 and B 804) may maintain uniform dynamic security policies at each boundary of their distinct networks, while simultaneously enabling different dynamic security policies to be maintained for each network.

Figure 9:
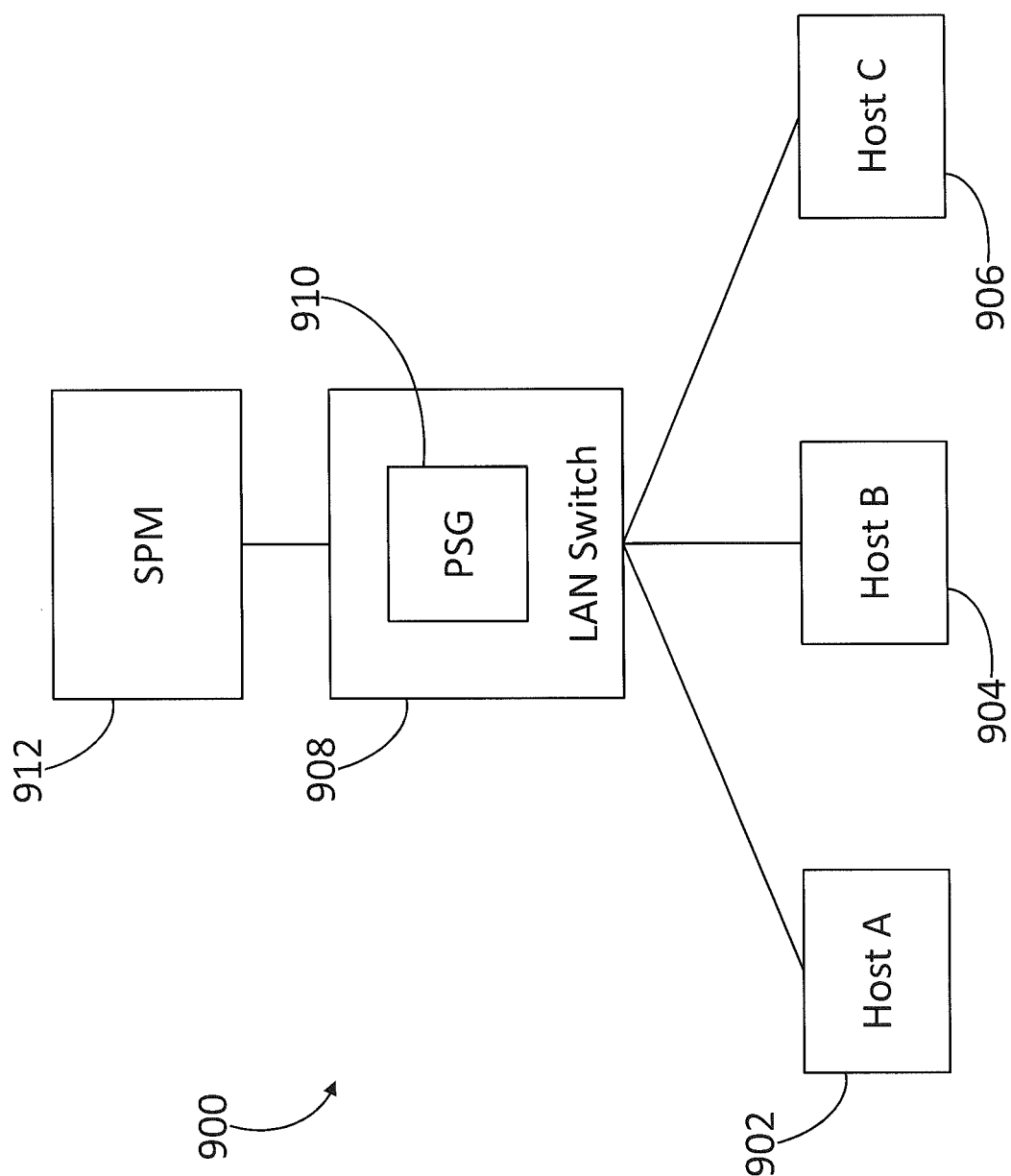
FIG. 9 illustrates an exemplary secure LAN environment.

FIG. 9 illustrates an exemplary secure LAN environment protected in accordance with one or more aspects of the disclosure. Referring to FIG. 9, network environment 900 may be a LAN, including hosts A 902, B 904, and C 906. It may also include LAN switch 908. LAN switch 908 may be configured to switch network traffic (e.g., packets) between one or more of hosts A 902, B 904, and C 906. For example, LAN switch 908 may include a switching matrix configured to switch packets received from one or more of hosts A 902, B 904, and C 906 to one or more of hosts A 902, B 904, and C 906. LAN switch 908 may be associated with packet security gateway 910, and network environment 900 may include security policy management server 912.

In some embodiments, packet security gateway 910 may be embedded within LAN switch 908. Alternatively, packet security gateway 910 may be a device distinct from LAN switch 908, and LAN switch 908 may be configured to route network traffic through packet security gateway 910 (e.g., by modifying LAN switch 908's switching matrix). Packet security gateway 910 may be configured to receive one or more dynamic security policies from security policy management server 912. The dynamic security policies received from security policy management server 912 may include one or more rules specifying criteria associated with one or more of hosts A 902, B 904, and C 906, and may further specify one or more packet transformation functions to be performed on packets matching the specified criteria. Packet security gateway 910 may identify packets matching one or more of the criteria specified by the rules and may perform the associated packet transformation functions on the identified packets. By utilizing packet security gateway 910 within network environment 900, an operator of network environment 900 may be able to protect network environment 900 from network attacks, as well as implement one or more services (e.g., blocklist service, allowlist service, VoIP firewall service, phased restoration service, enqueueing service, multi-dimensional routing service, or monitoring service) within network environment 900. Network environment 900 may include multiple LAN switches with embedded or associated packet security gateways, each of the packet security gateways configured to receive one or more dynamic security policies from security policy management server 912.

FIG. 10 illustrates an exemplary method for protecting a secured network in accordance with one or more embodiments. The steps may be performed at each of one or more packet security gateways associated with a security policy management server. For example, each of packet security gateways 112, 114, 116, and 118 may be associated with security policy management server 120, and the steps may be performed at each of packet security gateways 112, 114, 116, and 118. At step 1000, a dynamic security policy is received from the security policy management server. For example, packet security gateway 112 may receive dynamic security policy 300 from security policy management server 120. At step 1002, packets associated with a network protected by each respective packet security gateway are received. For example, packet security gateway 112 may receive UDP packets from a device within network E 110 having an address that begins with 150 and that are destined for port 3030 of a device within network A 102. At step 1004, a packet transformation function specified by the dynamic security policy is performed on the packets. For example, rule 308 of dynamic security policy 300 may specify that packets using the UDP protocol, coming from a source address that begins with 150, having any source port, destined for any address, and destined for port 3030 should have an accept packet transformation function performed on them, packet filter 214 may identify the UDP packets received from the device within network E 110 as matching the criteria specified by rule 308, packet transformation function 1 216 may be configured to forward packets, and packet security gateway 112 may utilize packet transformation function 1 216 to perform the accept packet transformation function specified by rule 308 on the UDP packets received from the device within network E 110.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing servers and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

What is claimed is:

1. A method of filtering packets at a packet security gateway, of a plurality of packet security gateways that collectively provide an entire interface across a boundary of a network protected by the packet security gateway and one or more networks other than the network protected by the packet security gateway, the method comprising:
- receiving, by the packet security gateway and from a security policy management server external from the network protected by the packet security gateway, a dynamic security policy comprising a first set of packet filtering rules to be applied to all network traffic traversing the boundary, wherein:
  - each packet filtering rule of the first set of packet filtering rules comprises at least one packet matching criterion and a corresponding packet transformation function, and
  - one or more first packet filtering rules of the first set of packet filtering rules comprise packet matching criteria corresponding to one or more network addresses and were automatically created or altered by the security policy management server based on aggregated malicious traffic information received from at least one third party malicious host tracker service located in the one or more networks other than the network protected by the packet security gateway, that comprises network addresses that have been determined, by the at least one third party malicious host tracker service, to be associated with malicious network traffic;
- performing, on a packet by packet basis, packet filtering on a first portion of packets corresponding to network traffic traversing the boundary via the packet security gateway based on the first set of packet filtering rules by performing at least one packet transformation function specified by at least one packet filtering rule of the first set of packet filtering rules on the first portion of packets;
- receiving, by the packet security gateway and after performing packet filtering on the first portion of the packets, an updated second set of packet filtering rules for the dynamic security policy from the security policy management server, wherein the updated second set of packet filtering rules comprises an update to the one or more first packet filtering rules created or altered by the security policy management server based on updated malicious traffic information received from the at least one third party malicious host tracker service; and
- performing, on a packet by packet basis, packet filtering on a second portion of the packets corresponding to network traffic traversing the boundary via the packet security gateway based on the updated second set of packet filtering rules by performing at least one packet transformation function specified by at least one packet filtering rule of the second set of packet filtering rules on the second portion of packets.

2. The method of claim 1, wherein the at least one packet matching criterion corresponding to the one or more first packet filtering rules automatically created or altered by the security policy management server comprises at least one of the one or more network addresses.

3. The method of claim 1, wherein the at least one third party malicious host tracker service comprises a subscription service that aggregates information associated with malicious network traffic.

4. The method of claim 1, wherein the one or more network addresses were associated, by a subscription service, with malicious network traffic.

5. The method of claim 1, wherein at least one packet transformation function comprises a network protective action.

6. The method of claim 1, further comprising:
- receiving, by the packet security gateway, packets in a network layer transparent manner using an interface that is not addressed at the network layer; and
- performing the at least one packet transformation function specified by at least one packet filtering rule of the first set of packet filtering rules on the first portion of packets at the network layer.

7. The method of claim 1, wherein one or more packet filtering rules of the first set of packet filtering rules specify a packet transformation function other than forwarding or dropping the corresponding packets.

8. A packet security gateway, of a plurality of packet security gateways that collectively provide an entire interface across a boundary of a network protected by the packet security gateway and one or more networks other than the network protected by the packet security gateway, comprising:
- one or more processors; and
- memory storing instructions that, when executed by the one or more processors, cause the packet security gateway to:
  - receive, from a security policy management server external from the network protected by the packet security gateway, a dynamic security policy comprising a first set of packet filtering rules to be applied to all network traffic traversing the boundary, wherein:
    - each packet filtering rule of the first set of packet filtering rules comprises at least one packet matching criterion and a corresponding packet transformation function, and
    - one or more first packet filtering rules of the first set of packet filtering rules comprise packet matching criteria corresponding to one or more network addresses and were automatically created or altered by the security policy management server based on aggregated malicious traffic information, received from at least one third party malicious host tracker service located in the one or more networks other than the network protected by the packet security gateway, that comprises network addresses that have been determined, by the at least one third party malicious host tracker service, to be associated with malicious network traffic;
  - perform, on a packet by packet basis, packet filtering on a first portion of packets corresponding to network traffic traversing the boundary via the packet security gateway based on the first set of packet filtering rules by performing at least one packet transformation function specified by at least one packet filtering rule of the first set of packet filtering rules on the first portion of packets;
  - receive, after performing packet filtering on the first portion of the packets, an updated second set of packet filtering rules for the dynamic security policy from the security policy management server, wherein the updated second set of packet filtering rules comprises an update to the one or more first packet filtering rules created or altered by the security policy management server based on updated malicious traffic information received from the at least one third party malicious host tracker service; and
  - perform, on a packet by packet basis, packet filtering on a second portion of the packets corresponding to network traffic traversing the boundary via the packet security gateway based on the updated second set of packet filtering rules by performing at least one packet transformation function specified by at least one packet filtering rule of the second set of packet filtering rules on the second portion of packets.

9. The packet security gateway of claim 8, wherein the at least one packet matching criterion corresponding to the one or more first packet filtering rules automatically created or altered by the security policy management server comprises at least one of the one or more network addresses.

10. The packet security gateway of claim 8, wherein the at least one third party malicious host tracker service comprises a subscription service that aggregates information associated with malicious network traffic.

11. The packet security gateway of claim 8, wherein the one or more network addresses were associated, by a subscription service, with malicious network traffic.

12. The packet security gateway of claim 8, wherein at least one packet transformation function comprises a network protective action.

13. The packet security gateway of claim 8, wherein the instructions further cause the packet security gateway to:
  receive packets in a network layer transparent manner using an interface that is not addressed at the network layer; and
  perform the at least one packet transformation function specified by at least one packet filtering rule of the first set of packet filtering rules on the first portion of packets at the network layer.

14. The packet security gateway of claim 8, wherein one or more packet filtering rules of the first set of packet filtering rules specify a packet transformation function other than forwarding or dropping the corresponding packets.

15. One or more non-transitory computer readable media storing instructions that, when executed by at least one processor, cause a packet security gateway, of a plurality of packet security gateways that collectively provide an entire interface across a boundary of a network protected by the packet security gateway and one or more networks other than the network protected by the packet security gateway, to perform steps comprising:
  receiving, from a security policy management server external from the network protected by the packet security gateway, a dynamic security policy comprising a first set of packet filtering rules to be applied to all network traffic traversing the boundary, wherein:
    each packet filtering rule of the first set of packet filtering rules comprises at least one packet matching criterion and a corresponding packet transformation function, and
    one or more first packet filtering rules of the first set of packet filtering rules comprise packet matching criteria corresponding to one or more network addresses and were automatically created or altered by the security policy management server based on aggregated malicious traffic information received from at least one third party malicious host tracker service located in the one or more networks other than the network protected by the packet security gateway, that comprises network addresses that have been determined, by the at least one third party malicious host tracker service, to be associated with malicious network traffic;
  performing, on a packet by packet basis, packet filtering on a first portion of packets corresponding to network traffic traversing the boundary via the packet security gateway based on the first set of packet filtering rules by performing at least one packet transformation function specified by at least one packet filtering rule of the first set of packet filtering rules on the first portion of packets;
  receiving, after performing packet filtering on the first portion of the packets, an updated second set of packet filtering rules for the dynamic security policy from the security policy management server, wherein the updated second set of packet filtering rules comprises an update to the one or more first packet filtering rules created or altered by the security policy management server based on updated malicious traffic information received from the at least one third party malicious host tracker service; and
  performing, on a packet by packet basis, packet filtering on a second portion of the packets corresponding to network traffic traversing the boundary via the packet security gateway based on the updated second set of packet filtering rules by performing at least one packet transformation function specified by at least one packet filtering rule of the second set of packet filtering rules on the second portion of packets.

16. The computer readable media of claim 15, wherein the at least one packet matching criterion corresponding to the one or more first packet filtering rules automatically created or altered by the security policy management server comprises at least one of the one or more network addresses.

17. The computer readable media of claim 15, wherein the at least one third party malicious host tracker service comprises a subscription service that aggregates information associated with malicious network traffic, and wherein the one or more network addresses were associated, by a subscription service, with malicious network traffic.

18. The computer readable media of claim 15, wherein at least one packet transformation function comprises a network protective action.

19. The computer readable media of claim 15, further comprising:
  receiving, by the packet security gateway, packets in a network layer transparent manner using an interface that is not addressed at the network layer; and
  performing the at least one packet transformation function specified by at least one packet filtering rule of the first set of packet filtering rules on the first portion of packets at the network layer.

20. The computer readable media of claim 15, wherein one or more packet filtering rules of the first set of packet filtering rules specify a packet transformation function other than forwarding or dropping the corresponding packets.

21. A method of filtering packets at a packet security gateway configured for protection of a network and associated with a security policy management server external from the network, the method comprising:
  receiving, by the packet security gateway, a dynamic security policy comprising a first set of packet filtering rules from the security policy management server, wherein each packet filtering rule of the first set of packet filtering rules comprises at least one packet matching criterion and a corresponding packet transformation function, and wherein one or more first packet filtering rules of the first set of packet filtering rules comprise packet matching criteria corresponding to one or more network addresses and were automatically created or altered by the security policy management server based on aggregated malicious traffic information received from at least one third party malicious host tracker service located in the one or more networks other than the network protected by the packet security gateway, that comprises network addresses that have been determined, by the at least one third party malicious host tracker service, to be associated with malicious network traffic;

performing, on a packet by packet basis, packet filtering on a first portion of packets associated with the network protected by the packet security gateway based on the first set of packet filtering rules by performing at least one of multiple packet transformation functions specified by at least one packet filtering rule of the first set of packet filtering rules on the first portion of packets;

receiving, by the packet security gateway and after performing packet filtering on the first portion of the packets, an updated second set of packet filtering rules for the dynamic security policy from the security policy management server, wherein the updated second set of packet filtering rules comprises an update to the one or more first packet filtering rules created or altered by the security policy management server based on updated malicious traffic information received from the at least one third party malicious host tracker service; and performing, on a packet by packet basis, packet filtering on a second portion of the packets associated with the network protected by the packet security gateway based on the updated second set of packet filtering rules.

22. The method of claim 21, wherein the at least one packet matching criterion corresponding to the one or more first packet filtering rules automatically created or altered by the security policy management server comprises at least one of the one or more network addresses.

23. The method of claim 21, wherein the at least one third party malicious host tracker service comprises a subscription service that aggregates information associated with malicious network traffic.

24. The method of claim 21, wherein the one or more network addresses were associated, by a subscription service, with malicious network traffic.

25. The method of claim 21, wherein at least one packet transformation function comprises a network protective action.

26. The method of claim 21, further comprising:
receiving, by the packet security gateway, packets in a network layer transparent manner using an interface that is not addressed at the network layer; and
performing the at least one packet transformation function specified by at least one packet filtering rule of the first set of packet filtering rules on the first portion of packets at the network layer.

27. The method of claim 21, wherein one or more packet filtering rules of the first set of packet filtering rules specify a packet transformation function other than forwarding or dropping the corresponding packets.

* * * * *

UNITED STATES PATENT AND TRADEMARK OFFICE
CERTIFICATE OF CORRECTION

PATENT NO. : 10,785,266 B2
APPLICATION NO. : 16/728766
DATED : September 22, 2020
INVENTOR(S) : Steven Rogers et al.

Page 1 of 1

It is certified that error appears in the above-identified patent and that said Letters Patent is hereby corrected as shown below:

On the Title Page

Page 4, Column 1, item (56) under Other Publications, Line 13:
Please delete "Mar. 21, 2020" and insert --Mar. 31, 2020--

In the Claims

Column 21, Claim 1, Line 19:
After "information" insert --,--

Column 23, Claim 15, Line 57:
After "information" insert --,--

Column 24, Claim 21, Line 66-67:
After "information" insert --,--

Signed and Sealed this
Fifth Day of January, 2021

Andrei Iancu
*Director of the United States Patent and Trademark Office*